US012601677B2

(12) United States Patent
Liang et al.

(10) Patent No.: US 12,601,677 B2
(45) Date of Patent: Apr. 14, 2026

(54) COLOR IMPEDANCE METHOD AND MODELING FOR IN-SITU SURFACE-SENSITIVE MEASUREMENTS ON ELECTRODE MATERIALS

(71) Applicant: The Board of Trustees of the Leland Stanford Junior University, Stanford, CA (US)

(72) Inventors: Yu-Lun Liang, Redwood City, CA (US); William C. Chueh, Menlo Park, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 438 days.

(21) Appl. No.: 18/222,561

(22) Filed: Jul. 17, 2023

(65) Prior Publication Data

US 2024/0044780 A1      Feb. 8, 2024

Related U.S. Application Data

(60) Provisional application No. 63/390,143, filed on Jul. 18, 2022.

(51) Int. Cl.
*G01N 21/31*          (2006.01)
*G01N 27/02*          (2006.01)

(52) U.S. Cl.
CPC ........... *G01N 21/31* (2013.01); *G01N 27/026* (2013.01)

(58) Field of Classification Search
CPC ............................ G01N 21/31; G01N 27/026
See application file for complete search history.

(56) References Cited

U.S. PATENT DOCUMENTS 9,274,059 B2 *   3/2016  Yu ........................... G01N 27/27

OTHER PUBLICATIONS

Impedance Modeling for Mixed Conductors with Simultaneous Insertion & Electrocatalytic Reactions, Allen Yu-Lun Liang and William C. Chueh 2022 J. Electrochem. Soc. 169 056502.

* cited by examiner

*Primary Examiner* — Jamel E Williams
(74) *Attorney, Agent, or Firm* — LUMEN PATENT FIRM

(57) ABSTRACT

Electrochemical reactivity is driven by the composition and structure of electrode surfaces. Monitoring surface chemistry in operando is thus crucial to understanding the behavior of electrodes yet is often inaccessible either due to resource limitations or to technical challenges in replicating realistic reaction environments. The invention presents a color impedance spectroscopy (CIS)-based technique to access operando surface measurements for mixed ionic-electronic conductors (MIECs). The CIS technique tunes the depth of charge carriers' movement within an electrode material by modulating the frequency of an applied AC electrochemical signal and monitors these changes spectroscopically. The results enable surface sensitivity in conventional bulk spectroscopies and provide new opportunities to characterize the operational behavior of MIEC electrodes.

7 Claims, 27 Drawing Sheets

FIG. 6A    Replacement Drawing Sheet 9/27

COLOR IMPEDANCE METHOD AND MODELING FOR IN-SITU SURFACE-SENSITIVE MEASUREMENTS ON ELECTRODE MATERIALS

CROSS-REFERENCE TO RELATED APPLICATIONS

This application claims priority from U.S. Provisional Patent Application 63/390,143 filed Jul. 18, 2022, which is incorporated herein by reference.

STATEMENT OF GOVERNMENT SPONSORED SUPPORT

This invention was made with Government support under contract DE-AC02-76SF00515 awarded by the Department of Energy. The Government has certain rights in the invention.

FIELD OF THE INVENTION

The invention relates to color impedance methods for surface-sensitive measurements on electrode materials.

BACKGROUND OF THE INVENTION

The push to reduce anthropogenic greenhouse gas emissions is driving efforts to decarbonize energy storage and chemical production through electrochemical approaches. At the most basic level, electrochemistry involves the conversion between chemical and electrical energy. This process occurs through the transfer of electrons and ions at the interface of an electrode surface and an electrolyte. In electrocatalytic systems, the energetics and composition of the electrode surface plays a decisive role in controlling the behavior and pathway of chemical reactions. For example, surface chemistry dictates the efficiency in water splitting, performance of fuel cells, and product selectivity during $CO_2$ reduction. On the other hand, the surface chemistry of a battery electrode, formed through interactions with the electrolyte, drastically affects the battery's performance, safety, and stability. Enabling widespread implementation of electrochemical processes for deep decarbonization thus requires a fundamental understanding of the chemistry of electrode surfaces.

During electrochemical reactions, the electrode material's surface composition and structure often is dynamic and exists only during operation (i.e., voltage is applied, and the system is energized). Recently, there have been extensive efforts to integrate operando capabilities (i.e. electrochemical control) into advanced surface characterization techniques. Examples include the meniscus method in Ambient-Pressure X-ray Photoemission Spectroscopy, grazing-incident X-ray Diffraction or Absorption, electrochemical scanning transmission microscopy (EC-STM) and second harmonic generation/sum frequency generation (SHG/SFG). These techniques provide deep insight into the atomic and electronic structure of electrode surfaces and have revealed important design principles and operational mechanisms in batteries, water electrolysis, fuel cells, and $CO_2$ reduction. Still, these techniques require specialized sample morphologies, such as atomically flat single crystal electrodes, and reaction environments far removed from practical devices, such as the <30 nm thick liquid electrolyte requirement in AP-XPS. Beyond the constraints of the technique and sample, these techniques almost exclusively require synchrotron X-ray sources, thereby limiting accessibility for the general practitioner. All the reasons above limit the efficiency and throughput of measuring the surface dynamics of electrodes and emphasize the need to develop alternative lab-based approaches.

SUMMARY OF THE INVENTION

In-situ surface-sensitive spectroscopic methods are crucial to understanding electrochemical materials systems, such as batteries and catalysts. Spectral analysis is a standardized method to study material properties. Understanding the surface of the materials at operating conditions enables improvements in efficiency, stability, and other material characteristics.

However, the state-of-the-art solutions, even in academic settings, mostly rely on one of the following options: (1) synchrotron setups, which only exist in national laboratories; (2) room-sized X-ray sources, which can easily cost millions of dollars; or (3) specific, highly crystalline model material systems, which limit the experimental subject selection to a few specific choices. These experimental options severely limit the access to studying the material surface in operation.

In this invention, the approach is lab-based, affordable, and generalizable to various spectroscopic light sources, unlocking the potential for widespread adoption.

In one embodiment, the setup is used for in-situ surface-sensitive measurement on an electrode in an electrochemical system. The surface sensitivity is achieved by applying an alternative-current signal to the usually-applied direct-current signal. We adjust the probing depth of the spectroscopy by tuning the frequency of the alternative-current signal. The perturbation in the material optical absorption/scattering is measured with a photodiode, which outputs the signal for analysis done by a frequency-response analyzer. The modeling work developed by the inventors can separate the surface spectrum of the electrode from the experimental results. The model is based on a transmission line electrochemical impedance model. By calculating the ion-concentration perturbation at each material depth, the model can separate the surface spectrum from the bulk spectrum through best-fit optimization.

The light source of the spectroscopy, in theory, can be any steady light source. To demonstrate the setup's power, we have successfully obtained the surface spectrum of a nickel hydroxide electrode at electrocatalytic conditions with an ultraviolet-visible light source.

Commercial applications and possible products include an analytical instrument with the analysis software solution to streamline the measurements and data analysis.

Embodiments of this invention provide an affordable, easily accessible solution to study the electro-chemical process on the electrodes. This will be valuable to academic research labs and electrode material-developing companies.

As mentioned above, the existing solutions involve the usage of rare and expensive instruments or very specific model systems that may be difficult to generalize. Our approach has the following advantages:

(1) Affordable: the frequency response analyzer, photodiodes, and other accessories (such as electrochemical interface) cost less than $100 k combined, much more affordable than the status quo.

(2) Accessible: our approach doesn't rely on rare national laboratory resources. The entire setup can easily sit on a benchtop space, making it accessible to more researchers and companies. (3) Generalizable: our approach does not limit the type of light sources. This setup can theoretically turn any spectroscopic methods surface-sensitive with the correct detector and light source output.

A novel model calculates the possible electrochemical and color impedance responses with given parameters. An algorithm uses the model to find the best fit for the experimental data. The best fit output includes electrochemical kinetics parameters, bulk absorption spectrum, and surface absorption spectrum. The fitting routine uses the coding environment (MATLAB, Python) and their respective mathematic packages on optimization.

Variations include embodiments having improved signal-to-noise ratio of the setup; applying this technique on other material systems, such as lithium-metal or polymer catalyst electrodes; and adopting other spectroscopic light sources/techniques, such as Raman laser or lab-based X-ray.

In another embodiment, the invention is characterized as a method of performing surface selective optical characterization. The method distinguishes performing color impedance spectroscopy (CIS) on a sample over an input electrical frequency range to provide a CIS spectrum. Examples of samples are e.g. a metal oxide, metal hydroxide, a metal phosphate, a metal cyanide, a carbon-based polymer, or a mixture thereof. The input electrical frequency range is 0.001 Hz to 1 MHz. Data analysis is performed of the CIS spectrum to distinguish a surface CIS contribution to the CIS spectrum from a bulk CIS contribution to the CIS spectrum. Surface CIS contribution is outputted as a surface characterization result of the sample. The method can be varied by performing electrochemical impedance spectroscopy to provide auxiliary information for the data analysis.

The data analysis includes (i) calculating an ionic and an electronic concentration change with respect to a distance from a surface of the sample, (ii) calculating and analyzing an electrical response from the sample under an applied alternating electrical signal, (iii) assigning spectroscopic properties of a material with respect to a distance from the surface, (iv) calculating and analyzing a spectroscopic response from the samples under the applied alternating electrical signal, or any combination thereof.

The auxiliary information comprises a thickness of the sample, a dielectric constant of the sample, kinetics of an electron transport in the sample, kinetics of an ionic transport in the sample, an electronic capacitance of the sample, an ionic capacitance of the sample, an electronic reaction resistance at a sample-current collector interface, the electronic reaction resistance at a sample-electrolyte interface, an ionic reaction(s) resistance at the sample-electrolyte interface, and a sample-electrolyte interface charge capacitance.

The optical characterization is performed by an optical source originating from an X-ray, an ultraviolet source, a visible light source, an infrared light source, or a mixture thereof.

BRIEF DESCRIPTION OF THE DRAWINGS

FIGS. 1A-D show according to an exemplary embodiment of the invention the concept of using the AC-based color impedance spectroscopy for operando surface measurements (FIG. 1A) diagrams showing the depth of charge carriers' movement under applied perturbation at low or high AC frequencies. As the applied AC frequency determines the movement, the (FIG. 1B) plot conceptualizing concentration perturbation profile within the MIEC electrode as a function of distance from material surface. (FIG.

1C) When the electrode is under AC perturbation, measurements of the voltage or current oscillation at the current collector yield the electrochemical impedance spectroscopy (EIS). (FIG. 1D) Instead of measuring the voltage/current, one can direct a light source at the electrode and measure the scattered light intensity; the light intensity is also oscillating, yielding the color impedance spectroscopy (CIS).

(FIG. 2B) Calculated CIS results, with varying surface-to-bulk absorptivity, presented in a Nyquist plot. The arrow denotes the direction of increasing AC frequency. All calculations use baseline parameters (Supplementary Table 1) unless stated.

FIGS. 3A-D show according to an exemplary embodiment of the invention calculated Relation between bulk kinetic parameters and CIS outcome with Nyquist plots of: (FIG. 3A) EIS and (FIG. 3B) CIS response with various ionic (proton vacancy) diffusion coefficient. (FIG. 3C) EIS and (FIG. 3D) CIS response with various chemical capacitance. All calculations use baseline parameters unless stated.

FIGS. 6A-D show according to an exemplary embodiment of the invention spectrum component validation through varying sample thickness. To clarify whether the CIS results truly point to a surface layer that is distinct from the bulk material, we repeat the CIS experiments on samples with varying total thickness. (FIG. 6A-6B) demonstrate how the $\varepsilon_{surface}l_{surface}$ and $\varepsilon_{bulk}l_{bulk}$ values at selected wavelength vary with the total sample thickness. The shaded area indicates the 95% confidence interval (CI) from the fitting (obtained through inverse variance average over individual CI). (FIG. 6C-6D) each show cases the apparent absorptivity after removal of layer thickness contribution through linear fit, with the bulk absorptivity magnified 3×. (FIG. 6A) and (FIG. 6C) show the results with DC set at 1.4V, while (FIG. 6B) and (FIG. 6D) show those data from DC set at 1.6 V vs RHE.

(FIG. 21A) shows the results at 1.4 V vs. RHE, and (FIG. 21B) at 1.6 V vs RHE. The shaded area is the 95% confidence interval.

(FIG. 22B) repeats the same analysis at 1.6 V vs RHE. Here, only two data points falls within possible values and are visible, as other data points exceed the lower bound (3.57).

DETAILED DESCRIPTION

Figures 1A, 1B, 1C, 1D:
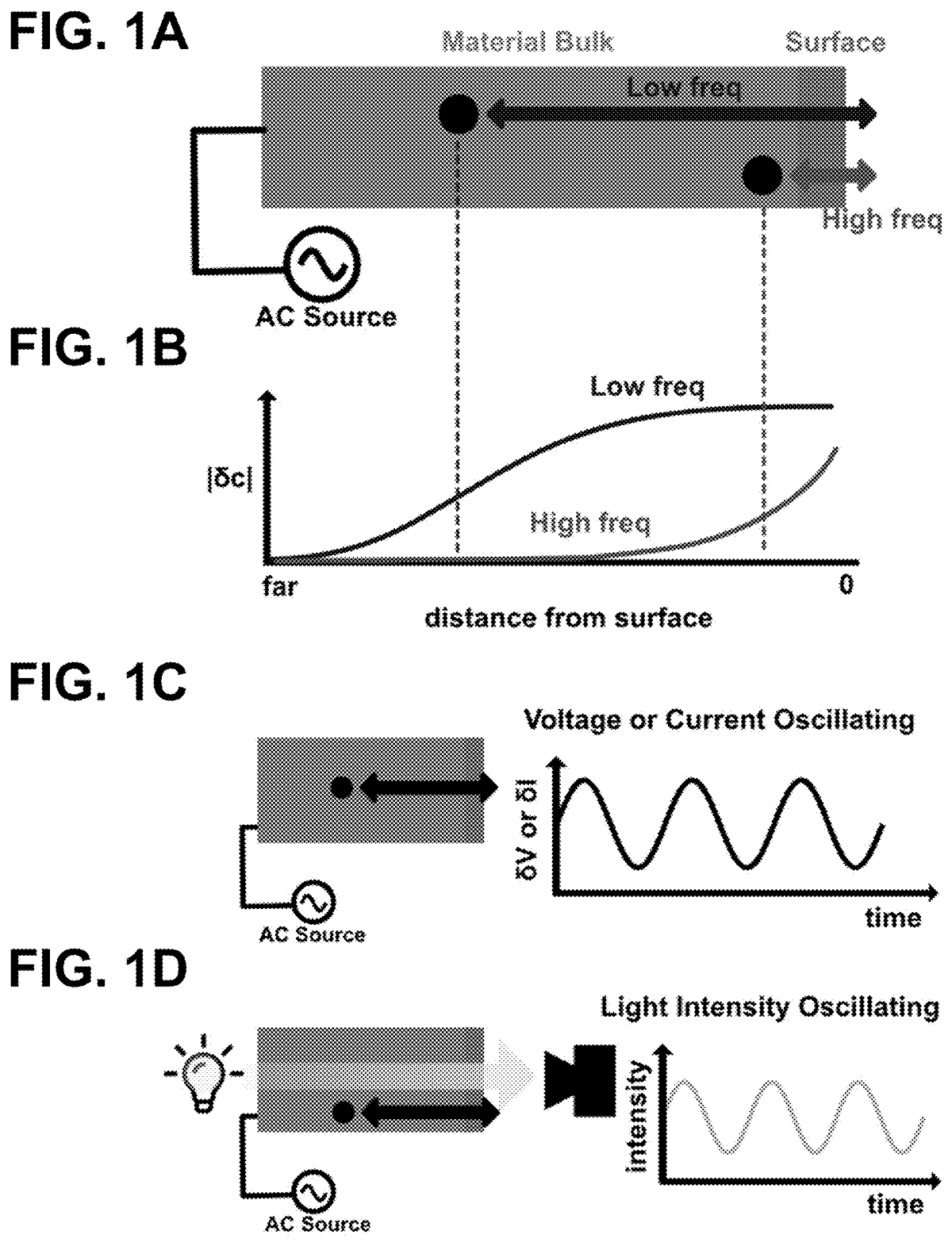
Figure 2A:
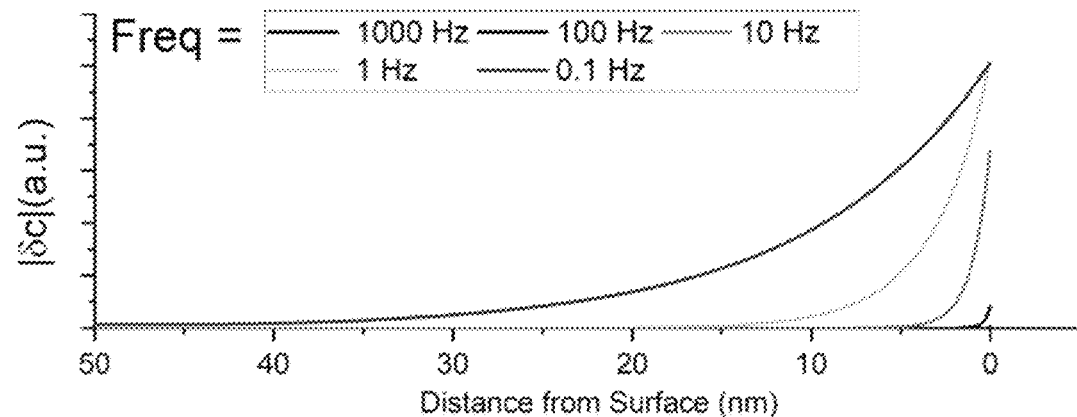
FIGS. 2A-B show according to an exemplary embodiment of the invention proving the CIS concept with forward simulation with (FIG. 2A) calculated magnitude of ion perturbation as a function of the distance from the surface. The diagram shows the distribution at various AC frequencies.

Here, rather than attempting to integrate operando capabilities into surface sensitive techniques, the inventors propose utilizing electrochemical approaches to tune bulk spectroscopies to yield surface-sensitive information. The inventors superimpose an alternating-current (AC) perturbation on the applied direct-current (DC) voltage. For mixed ionic-electronic conductors (MIEC) with charge carriers accessible at the DC voltage, the AC perturbation oscillates the particles across the electrode-electrolyte interface or within the electrode. The frequency of AC perturbation and the electrode's transport behavior dictate the depth of charge carrier's movements. As shown in FIG. 1A, at lower frequencies, the charge carrier has a more prolonged period to move deep into the material before the switch in AC polarization. In contrast, when the AC frequency is high, the charge carrier's movement is limited by its diffusivity and confined nearer to the material's surface. Thus, we can tune the charge carrier's concentration perturbation depth: limited to the material surface at higher AC frequencies and deeper into the bulk at lower frequencies (FIG. 1B). Typically, under applied AC frequencies, one measures the responding current or voltage signals at the current collector—a technique known as electrochemical impedance spectroscopy (EIS) (FIG. 1C). Here, we propose to couple the setup with a steady light source and observe the variation in optical density (OD) in addition to the EIS signal. The measured light signal should oscillate at the same frequency as the applied AC perturbation (FIG. 1D). Any perturbation in the photon signal originates from a net concentration change of charge carriers within the MIEC, meaning that the AC frequency directly tunes the observable depth of the light source. The concept enables any coupled spectroscopic methods to be surface-sensitive with applied AC at sufficiently high frequencies. Moreover, changing the wavelengths of the light source allows chemical property characterization at various electrode depths, including at the electrode material's surface. The inventors' work unlocks more operando surface-sensitive spectro-electrochemical approaches, specifically those cheaper, more accessible bench-top methods.

The approach to coupling AC frequencies with spectroscopic methods is commonly known as color impedance spectroscopy (CIS). Previous work on CIS focuses mainly on the kinetics of the faradaic process on electrochromic electrodes, including polymers, metal oxides, Prussian blue-analogs, and more. While these works successfully demonstrate the charge-transfer mechanism, none have realized the potential to tune the reaction depth with applied AC frequencies. To analyze the surface signal, one needs an AC impedance model with depth resolution on concentration perturbations.

For the purposes of this invention, the inventors demonstrate the validity of their idea through the following steps. First, one develops the impedance model for CIS and simulate the expected OD change. The forward simulation work compares the features of the calculation outcomes by varying the electrode's kinetic properties. Second, one builds the CIS experimental setup and validate the simulation results. Lastly, the model finds the best fit for the CIS experimental results and analyzes the surface spectrum of the samples. We demonstrate our approach utilizing Ultraviolet-Visible (UV-Vis) absorption spectroscopy as our light source, as it is one of the most widely accessible spectroscopic methods. UV-Vis is bulk-sensitive (absorption depth on the order of ~1 μm for solids), and we aim to demonstrate the power of CIS to extract surface spectra from even a UV-Vis setup. We adopt nickel (oxy)hydroxide throughout the experimental work as a model material. Nickel (oxy) hydroxide is a relevant MIEC with broad applications in energy storage and oxygen evolution reaction (OER) electrocatalysis. Moreover, the metal hydroxide shows distinct dynamic UV-Vis spectral changes in its redox state (~1.4 V vs. RHE) and OER conditions. Inventors work has hinted at a possible thin, dynamic surface layer on the nickel (oxy) hydroxide that serves as the active phase for OER, which we characterize through our CIS approach.

Color Impedance Data Modeling

Figure 7:
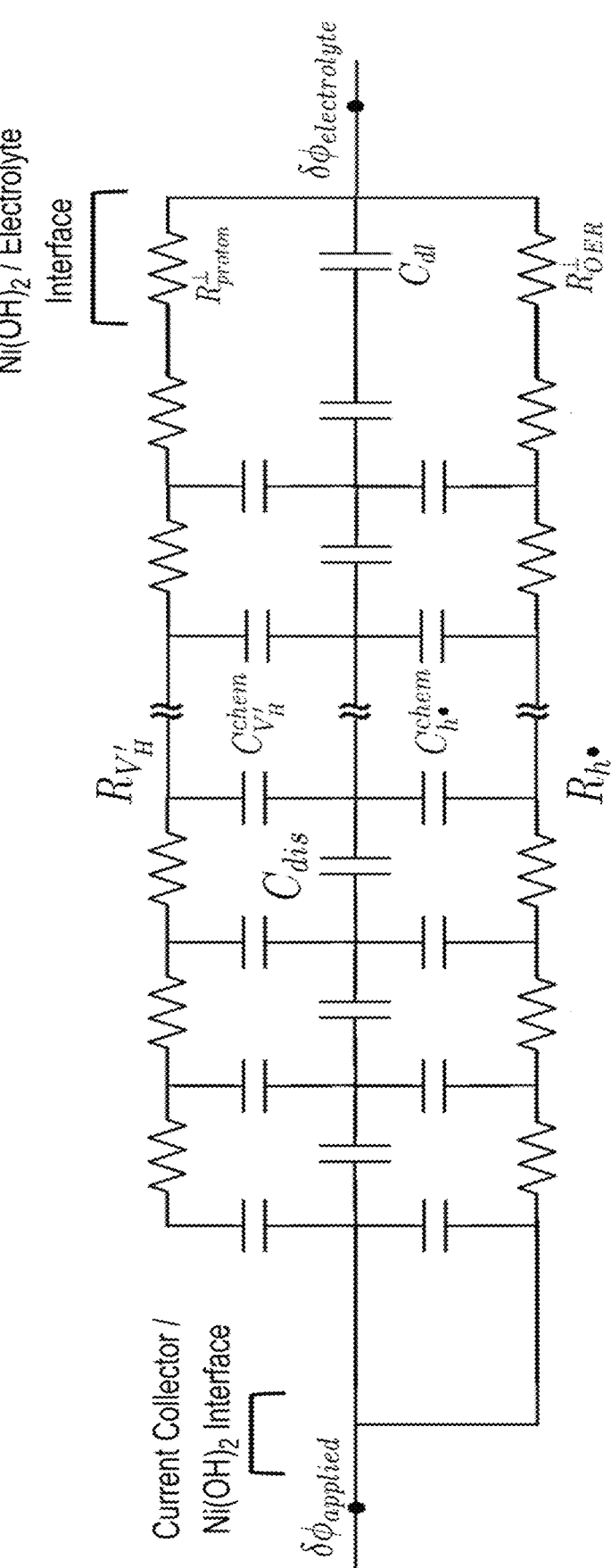
FIG. 7 shows according to an exemplary embodiment of the invention a transmission line-based impedance model. A transmission line impedance model for mixed ionic-electronic conductors with nickel (oxy)hydroxide parameters.

We first simulate the dependence of material transport and surface reactivity properties on CIS outcomes. Both EIS and CIS observe an electrode's response to an applied AC signal. In Supplementary Note 1, we build upon a mixed ionic-electronic conductor (MIEC) impedance model for transition metal hydroxides (FIG. 7), describing a 1-D electrode with ionic/electronic current depth resolutions. We calculate the optical density perturbation (SOD) from the EIS model output. Essentially, the postulation derives the concentration perturbation at each depth location, applies the Beer-Lambert Law, and integrates over the entire thickness for a total SOD. We choose the mobile ionic charge carrier species, proton vacancies, as the concentration term in the Beer-Lambert Law, since the ionic species charge-compensates nickel redox, the color center of the electrode. As the CIS compares the two oscillating signals (similar to EIS analysis), we plot the result in a Nyquist representation.

We choose a set of baseline EIS parameters (shown in Supplementary Table 1) as a starting point for the CIS simulation and comparison. FIG. 2A demonstrates AC signals at higher frequencies limit the concentration perturbation near the surface. However, the overall amplitude of concentration perturbation shrinks as the frequency increases, predicting a weak SOD signal. As a result, AC signals with exceedingly high frequencies barely oscillate the ions in the solid (i.e., the chemical capacitance acts as a pure conductor) and are unsuitable for CIS experiments. When designing the experiments, a well-selected upper cutoff AC frequency is crucial to avoid collecting non-representative, possibly misleading CIS data.

Figure 2B:
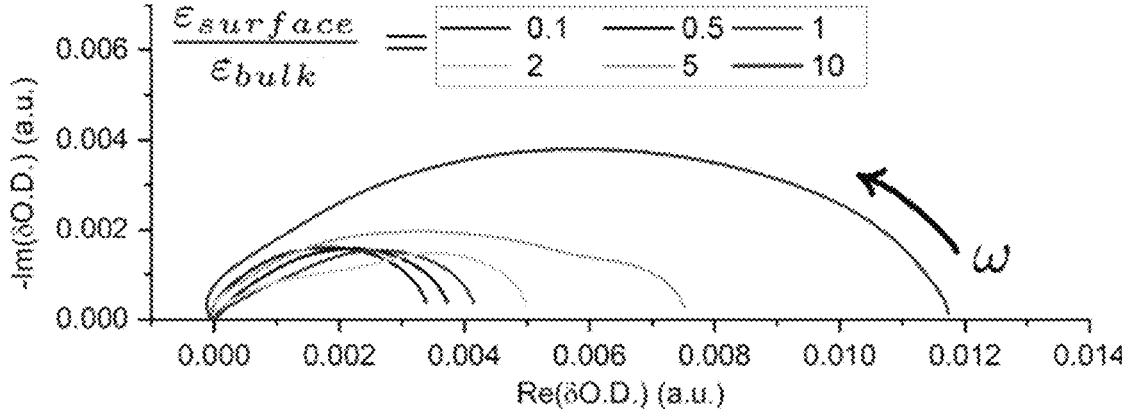

As our goal for the CIS is to observe the spectra of surface layers, we first vary the surface-to-bulk absorptivity ratio in FIG. 2B. One can notice that the magnitude and shape of curves spectrum vary drastically with the absorptivity ratio. The $\delta OD$ (in both axis) increases as the surface layer absorbs more strongly. Intuitively, with a stronger $\varepsilon_{bulk}$ or $\varepsilon_{surface}$, CIS experiments should yield stronger optical perturbation. The unique feature here is the shape of the curves: the difference in surface layer's chemical properties (reflected by the absorptivity ratio) dictate the shape of the curve. The varying shape is a key feature fitting algorithm relies on to find optimized fits for $\varepsilon_{bulk}$ and $\varepsilon_{surface}$. Besides the shape and the magnitude, one may notice that, at low frequencies, all curves end near the real $\delta OD$ axis. As the transport of charge carriers can follow the polarizing AC perturbation at very low frequencies, there should be no phase difference between the input AC and the output $\delta OD$ sine wave. Indeed, the Bode plot version (FIG. 8) shows that, regardless of the surface or bulk absorptivity ($\varepsilon_{bulk}$), all phase angle curves converge to zero degrees when the frequency approaches.

Figures 3A, 3B, 3C, 3D:
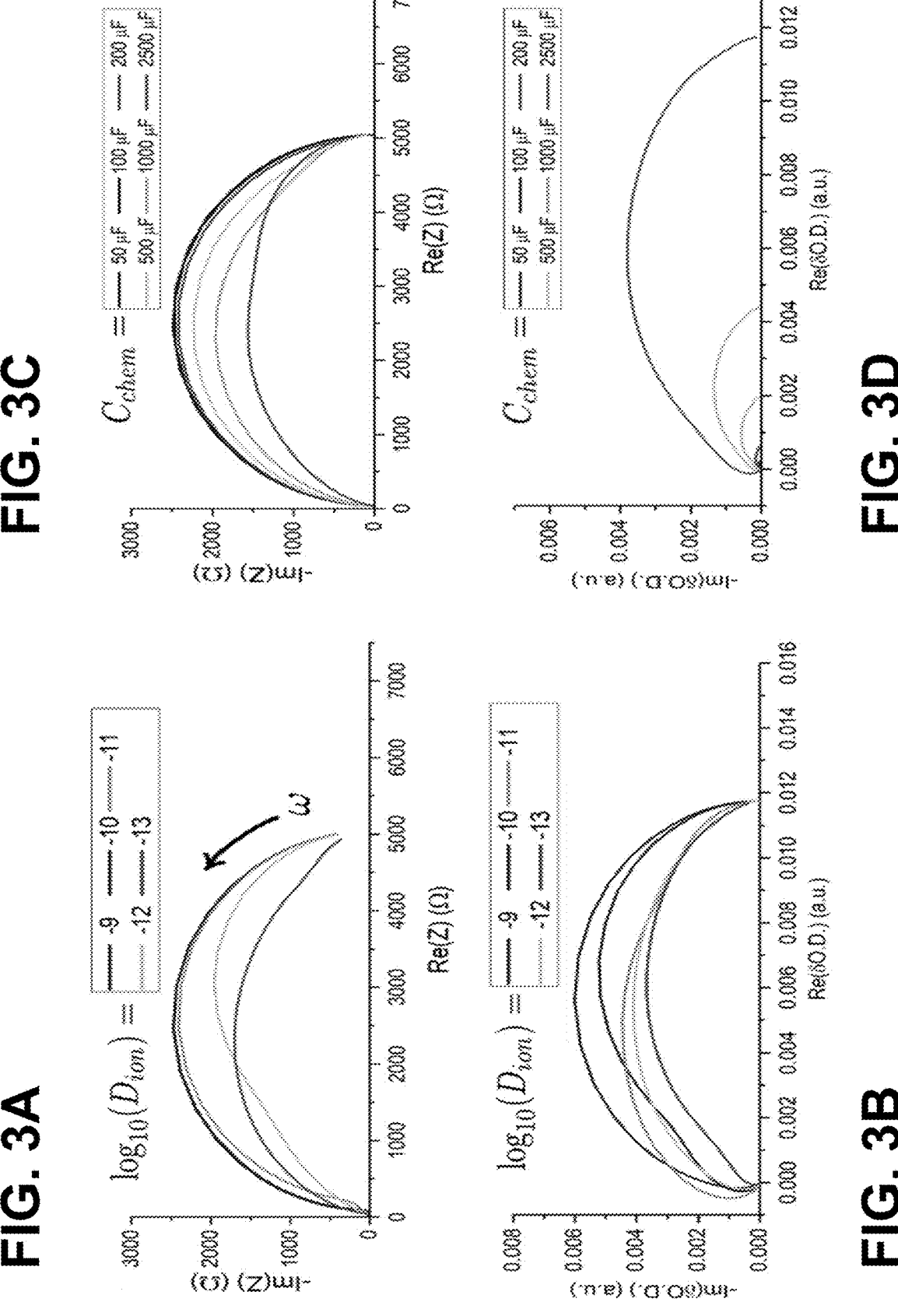
Figure 9:
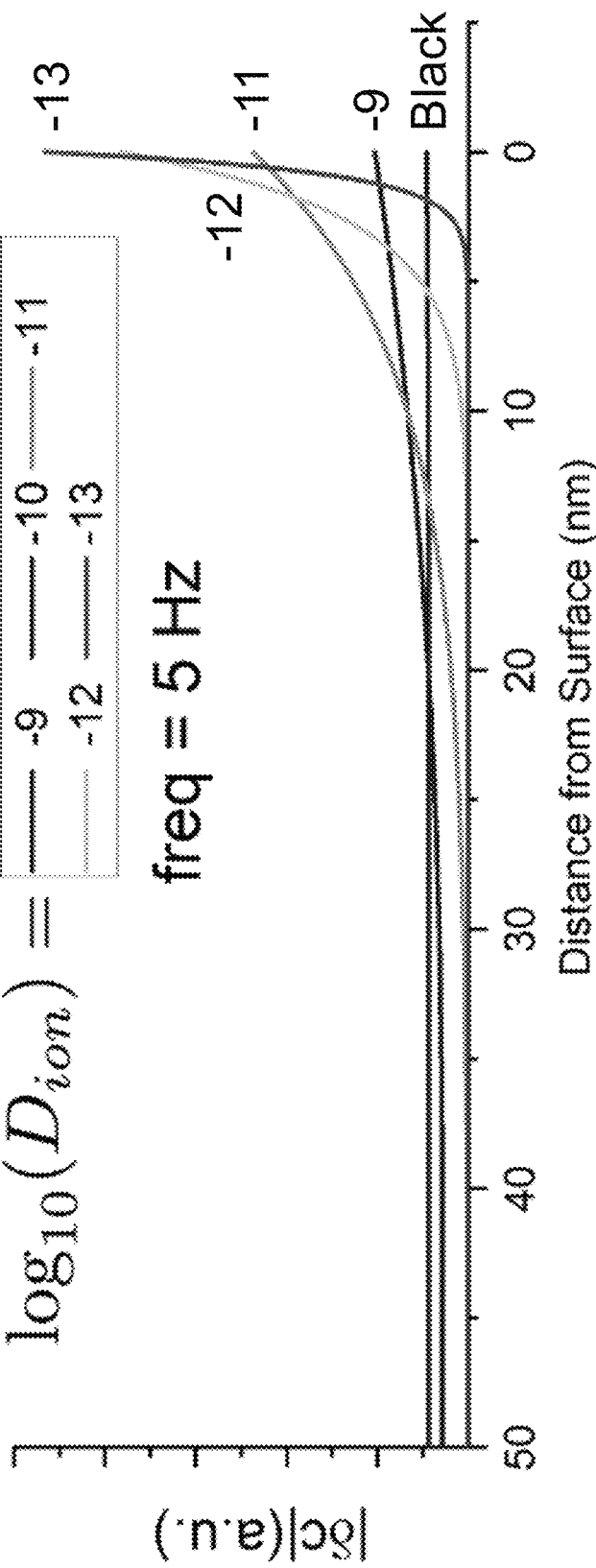
FIG. 9 shows according to an exemplary embodiment of the invention the effect of diffusivity on concentration perturbation profile. Calculated magnitude of concentration perturbation profile at AC frequency=5 Hz with various ionic (proton vacancy) diffusion coefficient.
Figures 10A, 10B:
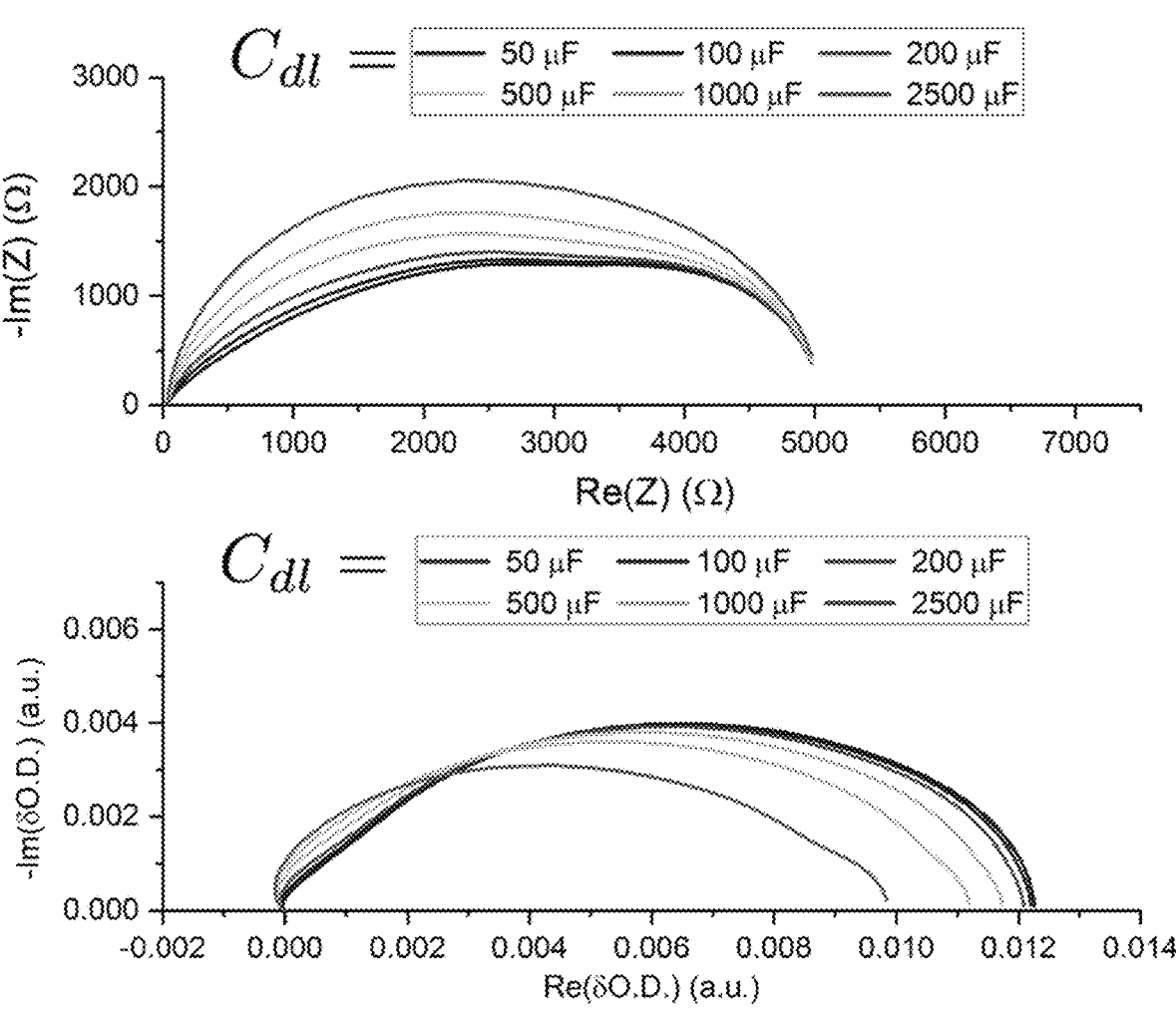
FIGS. 10A-B show according to an exemplary embodiment of the invention calculated Nyquist plots when varying $C_{dl}$. Calculated (FIG. 10A) EIS and ((FIG. 10B) CIS responses with various double layer capacitance values presented in Nyquist plots.
Figures 11A, 11B:
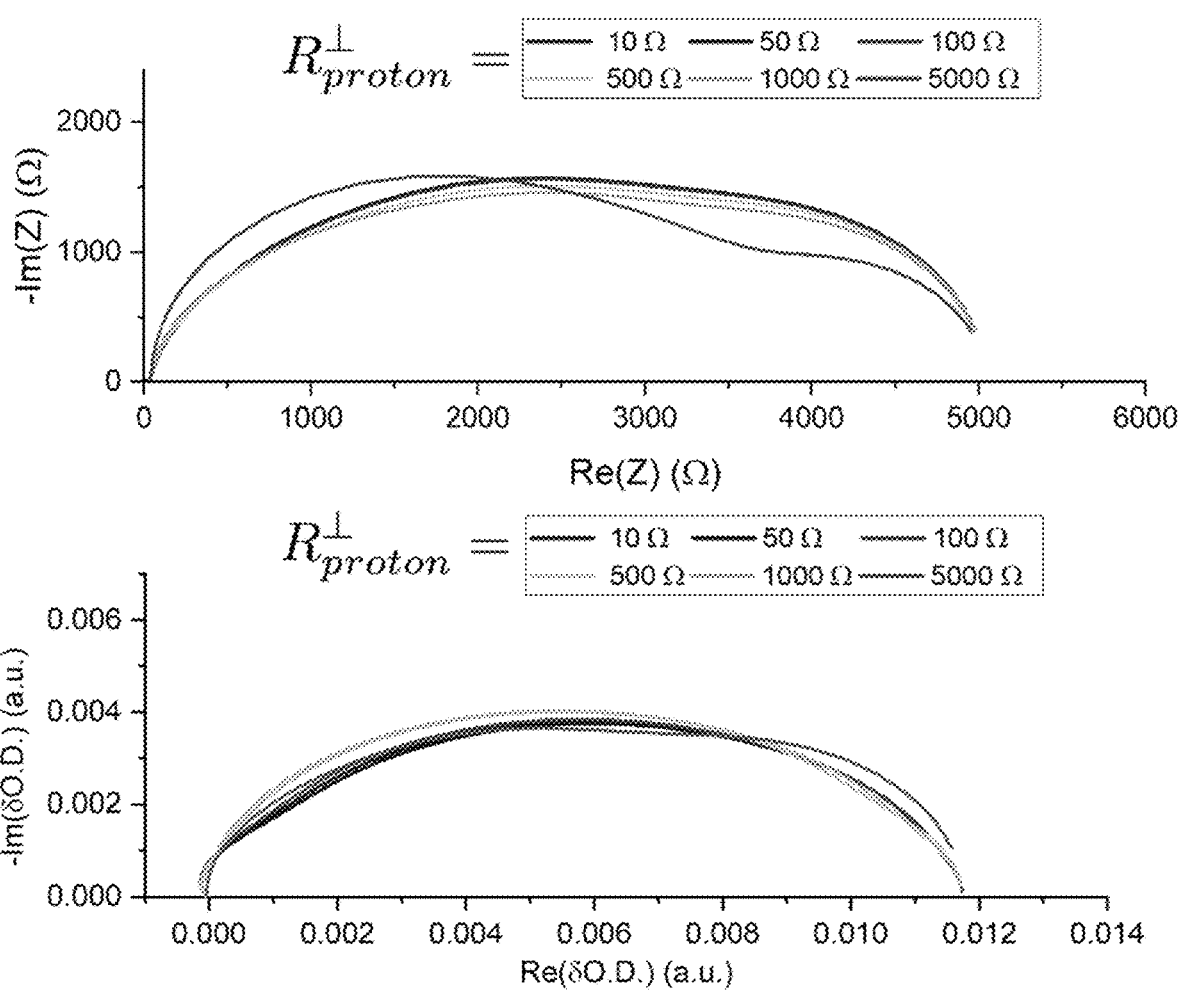
FIGS. 11A-B show according to an exemplary embodiment of the invention calculated Nyquist plots when varying $R_{proton}^{\perp}$ Calculated (FIG. 11A) EIS and (FIG. 11B) CIS responses with various proton-exchange charge transfer resistance, presented in Nyquist plots.
Figures 12A, 12B:
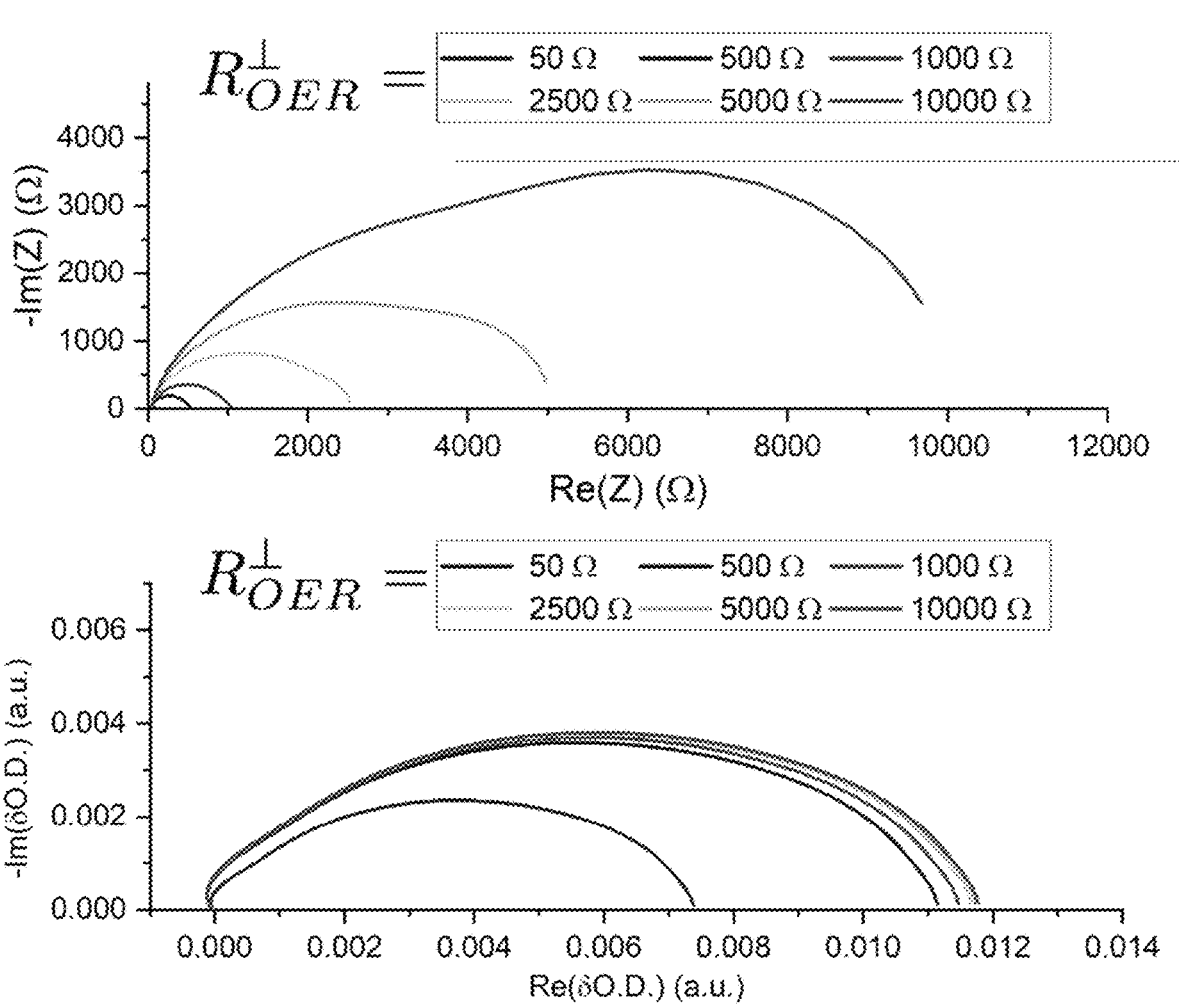
FIGS. 12A-B show according to an exemplary embodiment of the invention calculated Nyquist plots when varying $R_{OER}^{\perp}$. Calculated (FIG. 12A) EIS and (FIG. 12B) CIS responses with various oxygen evolution reaction charge transfer resistance, presented in Nyquist plots.

Bulk properties, including ionic diffusivity ($D_{ion}$) and chemical capacitance ($C_{chem}$), dominate the $\delta OD$ outcome. FIGS. 3A-D show how CIS adds a complementary dimension to EIS to decipher electrode kinetics. For example, in FIGS. 3A-B the EIS Nyquist plot demonstrates how a decreasing $D_{ion}$ causes a dramatic shift in the shape of curve by adding new features (e.g., Warburg element or curve depression). Simultaneously, CIS results also show huge changes in curve shapes, adding more features for transport kinetic and optical analysis at higher confidence level. Moreover, a slow $D_{ion}$ further limits the concentration perturbation closer to the surface (FIG. 9) and amplifies any surface signal by distorting the CIS curve even more. One may also claim that a distorted $\delta OD$ curve points to a slow diffusivity. As a result, an electrode with sufficiently slow $D_{ion}$ is necessary for CIS experiments. Similar observations can be made between the CIS magnitude and $C_{chem}$ changes. In FIGS. 3C-D, though changes in EIS results not as drastic, the magnitude of $\delta OD$ in CIS results scales strongly with chemical capacitance. Here, $C_{chem}$ correlates with the number of accessible charge carriers (e.g., amount of metal atoms undergoing redox). The magnitude change adds a strong feature for any fitting algorithm to extract kinetic and optical information. Overall, among the electrode kinetic parameters, $D_{ion}$ and $C_{chem}$ are the key determinants of the CIS outcome. For the empirical setup, the simulation results suggest adopting materials with larger chemical capacitance and slower kinetics to amplify the surface signal in CIS. For analyzing the impedance outcome, correct constraints on $D_{ion}$ and $C_{chem}$ are crucial for correct CIS analysis. Moreover, CIS results add extra data points to improve the fitting quality, suggesting co-fitting CIS and EIS for better data analysis.

On the other hand, the role of the interfacial (electrode-electrolyte interface) kinetics on $\delta OD$ seems less influential. For $R_{proton}^{-1}$ (proton exchange reaction resistance), $R_{OER}^{-1}$ (OER resistance), and $C_{dl}$ (double layer capacitance), substantial $\delta OD$ changes happen only when the interfacial kinetics change across orders-of-magnitude (FIGS. 10A-B, 11A-B, 12A-B). Often, the EIS results show higher degree of differences, meaning the CIS does not add values to the analysis of interfacial kinetics. The observation is expected, as CIS mainly probes the dynamics of absorptivity within the material and not at the interface. The Bode plot (FIG. 8) shows no significant changes above 100 Hz, regardless of how much surface absorptivity ($\varepsilon_{surface}$) varies. Within the frequency range of interfacial reaction perturbation, the resulting optical density magnitude is too low, and the phase remains identical. However, the cutoff frequencies of the interfacial RC time constant can shift the frequency range where the ions in the material oscillate. As a result, proper EIS analysis for the interfacial kinetics is required to set appropriate boundary limits for δOD fitting.

Figure 4:
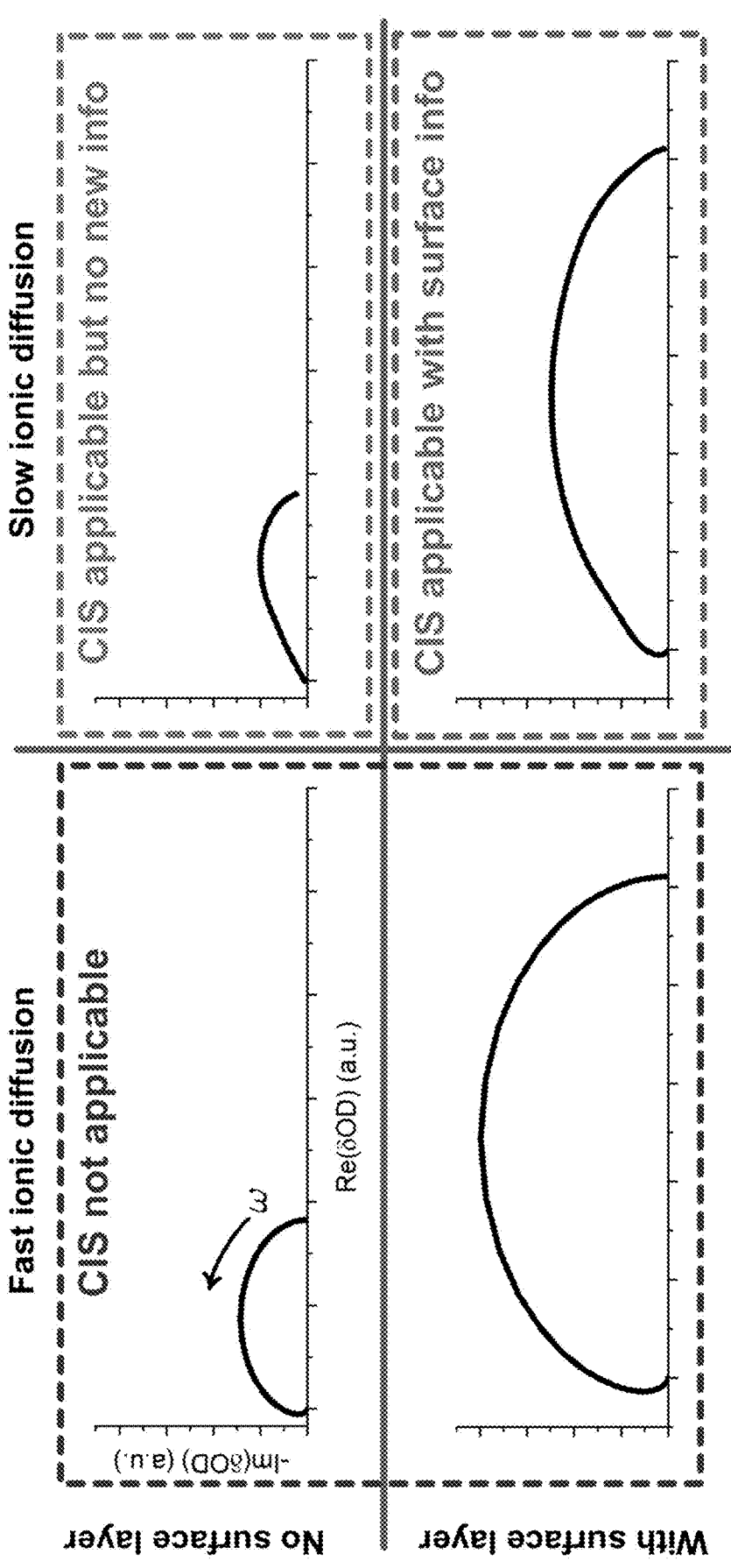
FIG. 4 shows according to an exemplary embodiment of the invention criteria for CIS. Diagrams illustrating when color impedance technique is applicable and beneficial. The criteria are based on the electrode's diffusivity and the existence of a heterogeneous surface layer.

Simulating the δOD results highlight CIS's benefits: correctly reflecting surface layers distinct from the bulk, potentially improving EIS parameters fitting quality, and guiding materials design for CIS experiments. However, the simulation reveals limitation on types of electrodes suitable for CIS. FIG. 4 shows rates that the rate of diffusion is a crucial determinator. Electrodes with fast diffusion cannot benefit from CIS, as varying surface layer properties does not generate new δOD features (only near-perfect semi-circles). Slow diffusivity causes δOD curves to deviate away from semicircles, providing features to analyze the existence and properties of a heterogeneous surface. Moreover, interfacial kinetics have minimal effect on CIS outcome, and proper boundaries on EIS kinetic parameters are crucial for δOD result analysis. As a result, while we allow bulk kinetic parameters to continue optimizing during δOD fitting, interfacial kinetics will be kept constant. Later, the model will be adopted in the experimental section to find the optimized fit for CIS result analysis.

Measured Color Impedance Results

Figure 13:
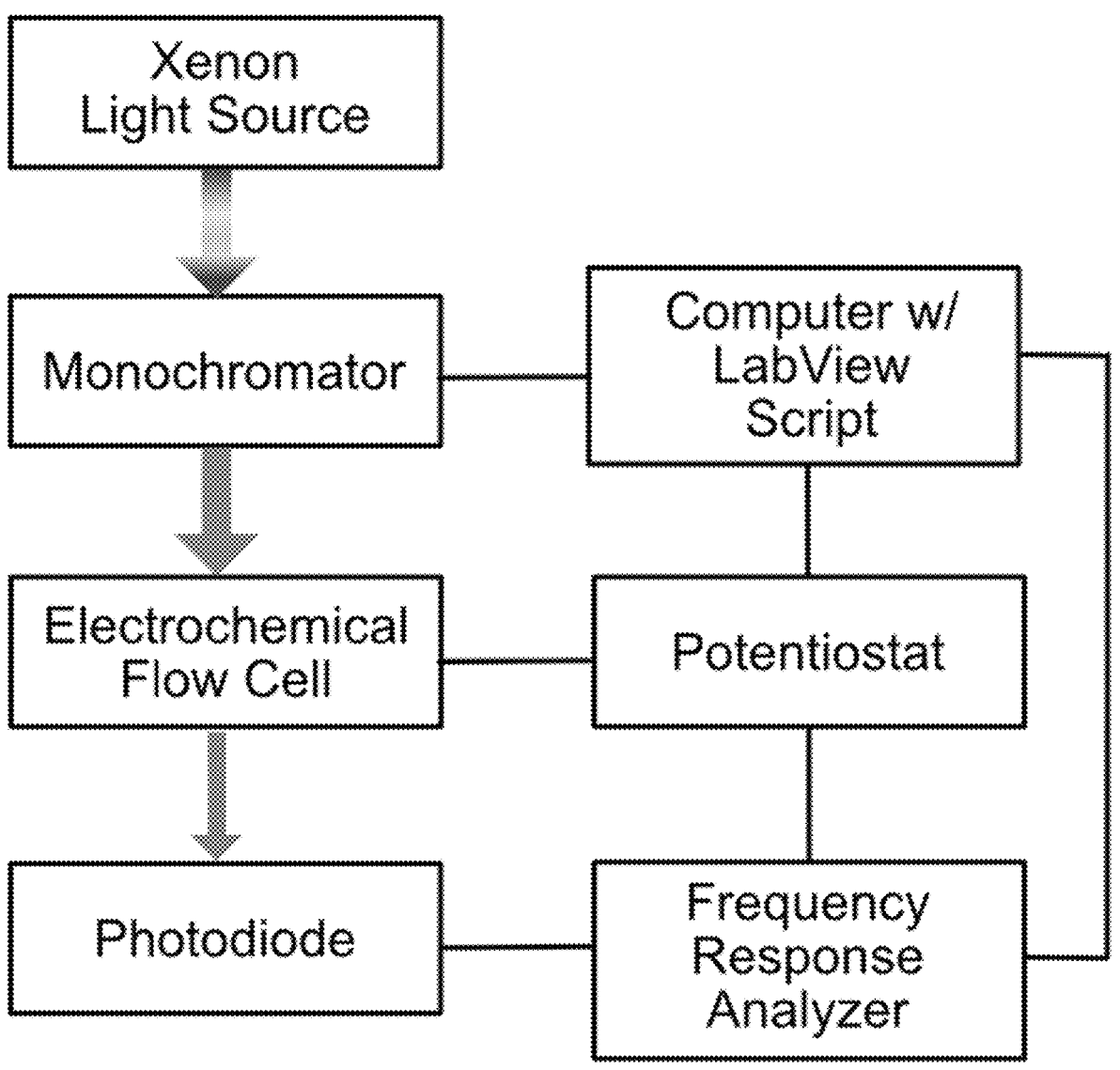
FIG. 13 shows according to an exemplary embodiment of the invention the CIS Experimental Setup. Black lines represent electrical input or control signal, while the arrows represent the light pathway.

FIG. 13 shows our experimental setup for the CIS demonstration. For the electrochemical component, a frequency response analyzer (FRA) generates an AC signal at a 50 mV amplitude, which is applied to the sample through a potentiostat that supplies the superimposed direct current (DC). A smaller AC amplitude results in a low signal-to-noise ratio, while a larger amplitude breaks the EIS linearity assumption. For the spectroscopic setup, a monochromator selects the wavelength of interest from a steady, brilliant UV-Vis light source. A photodiode reads the transmitted light signal, which the FRA compares to the applied AC. The FRA simultaneously reads the electric current from the sample for the EIS.

While the EIS result is a direct output, arriving at δOD from the FRA output requires further analysis. Detailed steps of the postulation are in the Supplementary Note 2. With the FRA output: $\bar{Y}_{FRA}=(\delta J_{photon}/(\delta V_{ac})$, where $\delta J_{photon}$ is the oscillating photocurrent signal from the photodiode, and the $\delta V_{ac}$ is the applied AC, we have $$\delta OD = -Y_{FRA}\left(\frac{\delta V_{ac}}{J_{photon}}\right)$$

Figure 14:
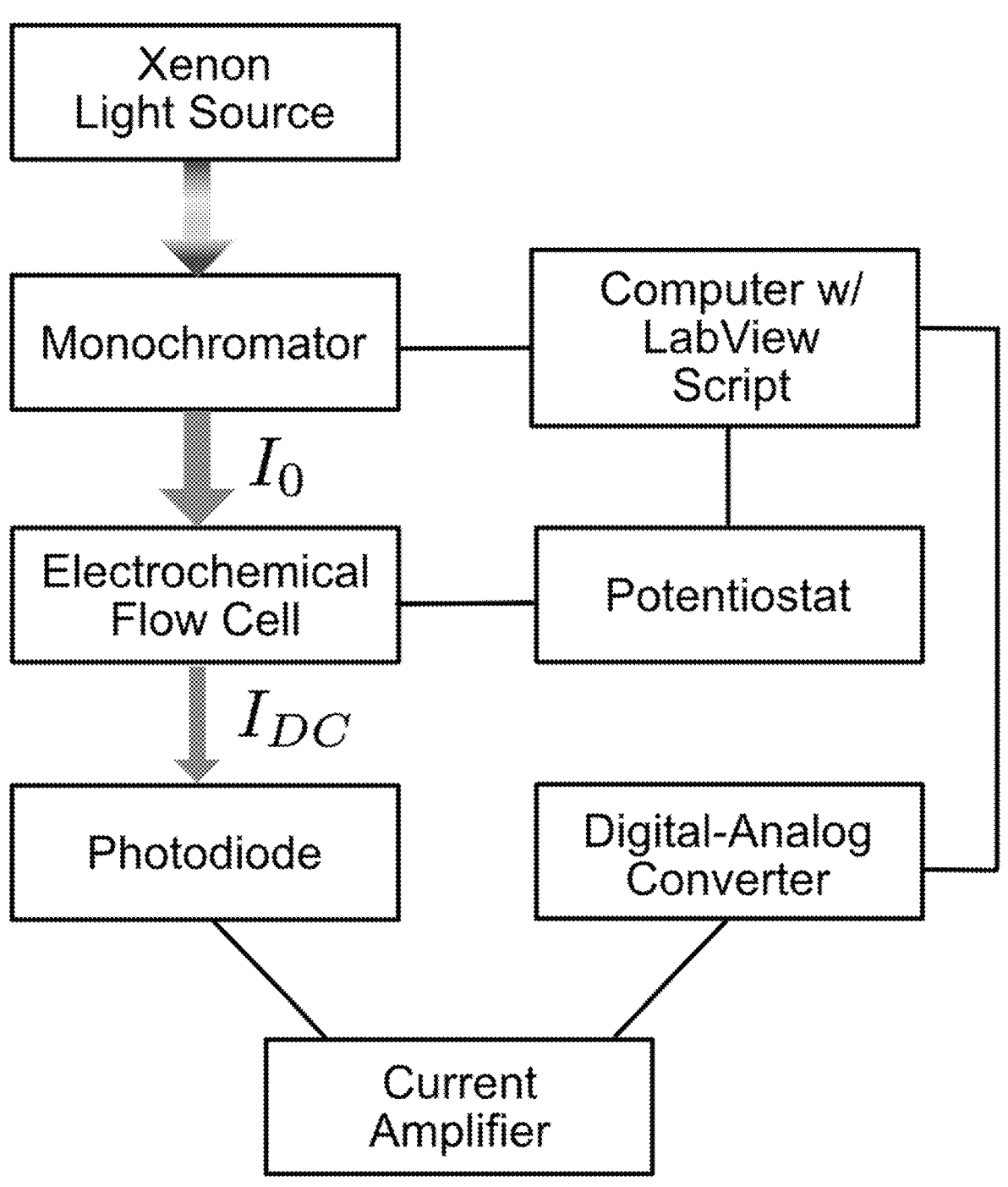
FIG. 14 shows according to an exemplary embodiment of the invention a setup for photodiode's DC response. Black lines represent electrical input or control signal, while the arrows represent the light pathway.

Here, $J_{photon}$ is the DC-only photocurrent from the photodiode, a constant obtained in a separate setup that does not involve an FRA (FIG. 14).

Figure 15:
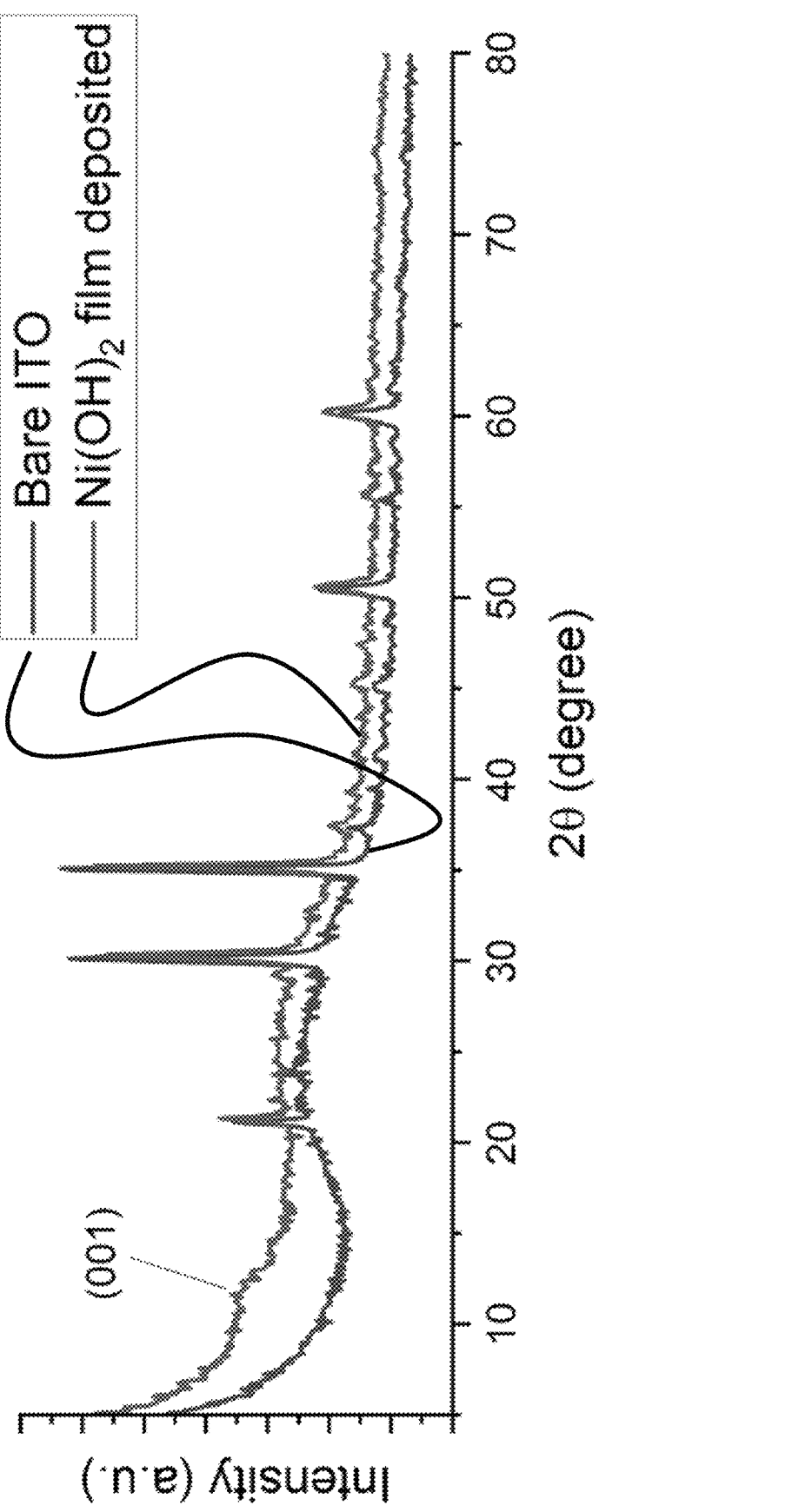
FIG. 15 shows according to an exemplary embodiment of the invention a sample crystal structure. Diffraction pattern of the deposited nickel (oxy)hydroxide film (25 pulses, ~140 nm measured by a stylus profilometer). A diffraction pattern of the ITO-glass substrate is also shown for comparison. A broad (001) peak indicate the presence of the $\alpha$ phase.
Figure 16:
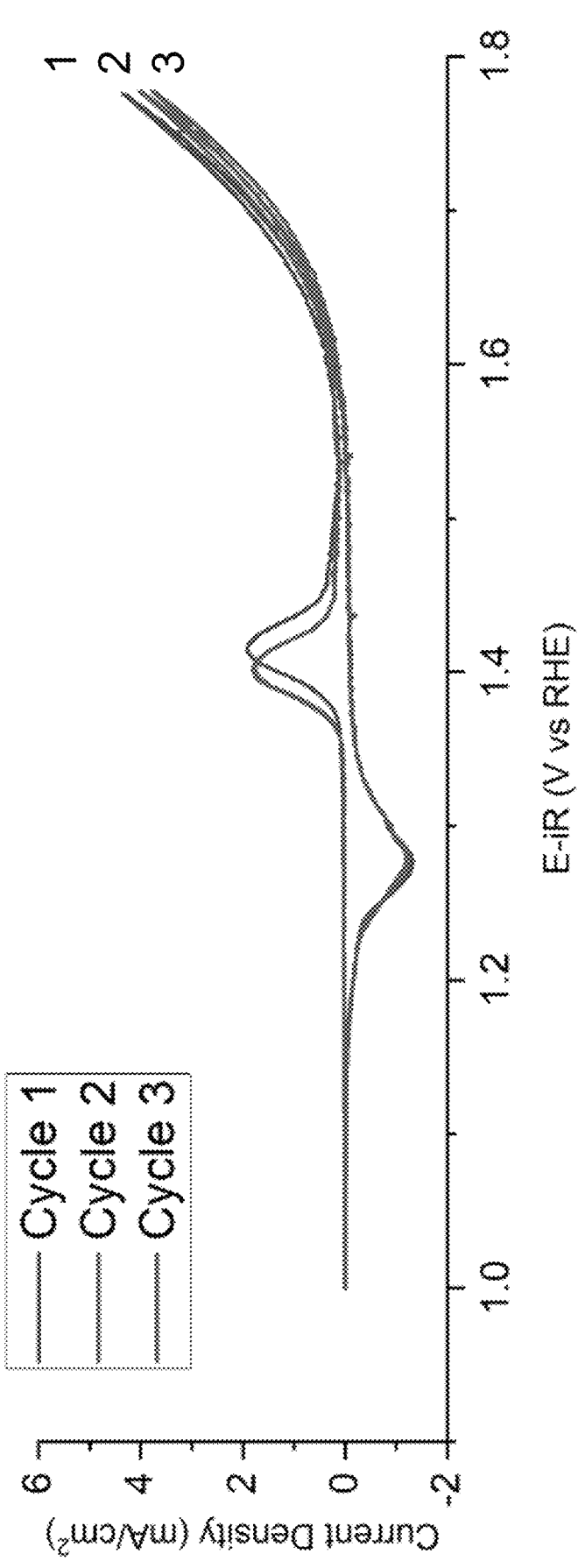
FIG. 16 shows according to an exemplary embodiment of the invention Nickel (Oxy)Hydroxide Cyclic voltammetry. A cyclic voltammogram of a 10-pulse nickel (oxy)hydroxide sample (~42 nm thick) in 0.1 M Fe-free KOH.

We apply our CIS approach to nickel (oxy)hydroxide thin films electrodes deposited on indium tin oxide (ITO)-coated glass through a cathodic pulse deposition method. The pulse deposition, modified from literature, allows us to control the sample thickness with the number of applied pulses. The nickel (oxy)hydroxide electrodes, mainly in the alpha-phase (FIG. 15), exhibit typical electrochemical features during cyclic voltammetry (FIG. 16). At ~1.4 V vs. RHE, the material undergoes a redox process ($Ni^{2+}\rightarrow Ni^{3+/4+}$) through exchanging protons with the electrolyte. At anodic potentials at and above 1.6 V, the OER is the dominant reaction on the electrode. Sufficiently slow diffusion within the electrodes put nickel (oxy)hydroxide a good candidate for CIS. Moreover, previous operando UV-Vis work observed distinct spectra between the OER and redox potential regions, hypothesizing heterogeneous surface layers on the electrode as the active OER phase. Therefore, we choose 1.4 V (nickel redox) and 1.6 V vs. RHE (most anodic potential without generating too many oxygen bubbles) as our applied DC to superimpose the AC signal.

Figure 5A:
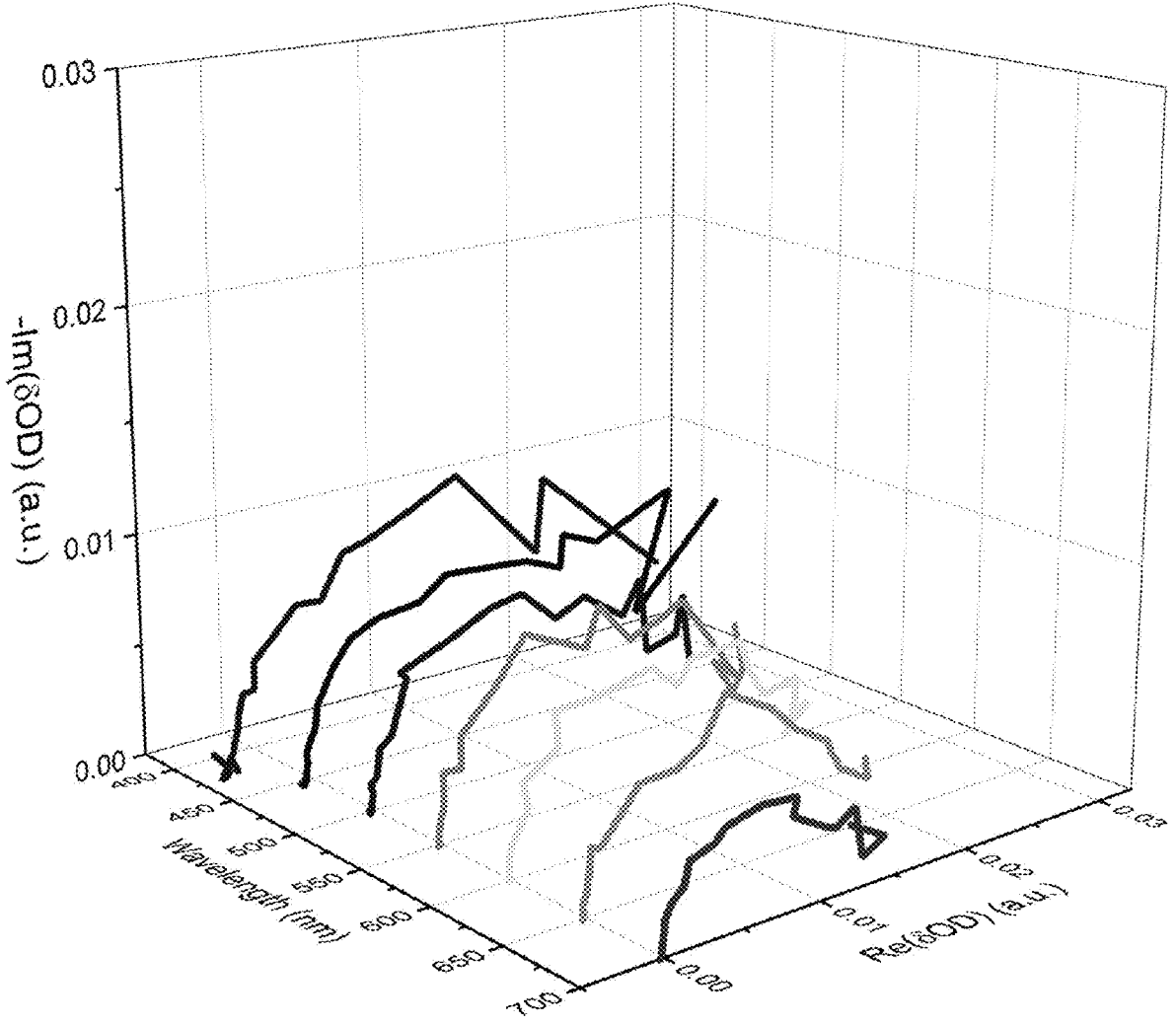
FIGS. 5A-F show according to an exemplary embodiment of the invention simultaneous EIS & CIS measurements on nickel (oxy)hydroxide film with (FIG. 5A) and (FIG. 5B) showcase the CIS Nyquist data measured on a 42 nm sample at an applied DC of 1.4 V and 1.6 V vs RHE, respectively. The additional dimension of photon energy (wavelength) is expressed as the third axis. For the data collected at 1.4 V vs RHE, co-fitting results for (FIG. 5C) EIS and (FIG. 5D) CIS (at $\lambda=450$ or 650 nm) are plotted. The co-fitting results for data collected at 1.6 V vs RHE are presented in the same manner in (FIG. 5E-5F).
Figure 5B:
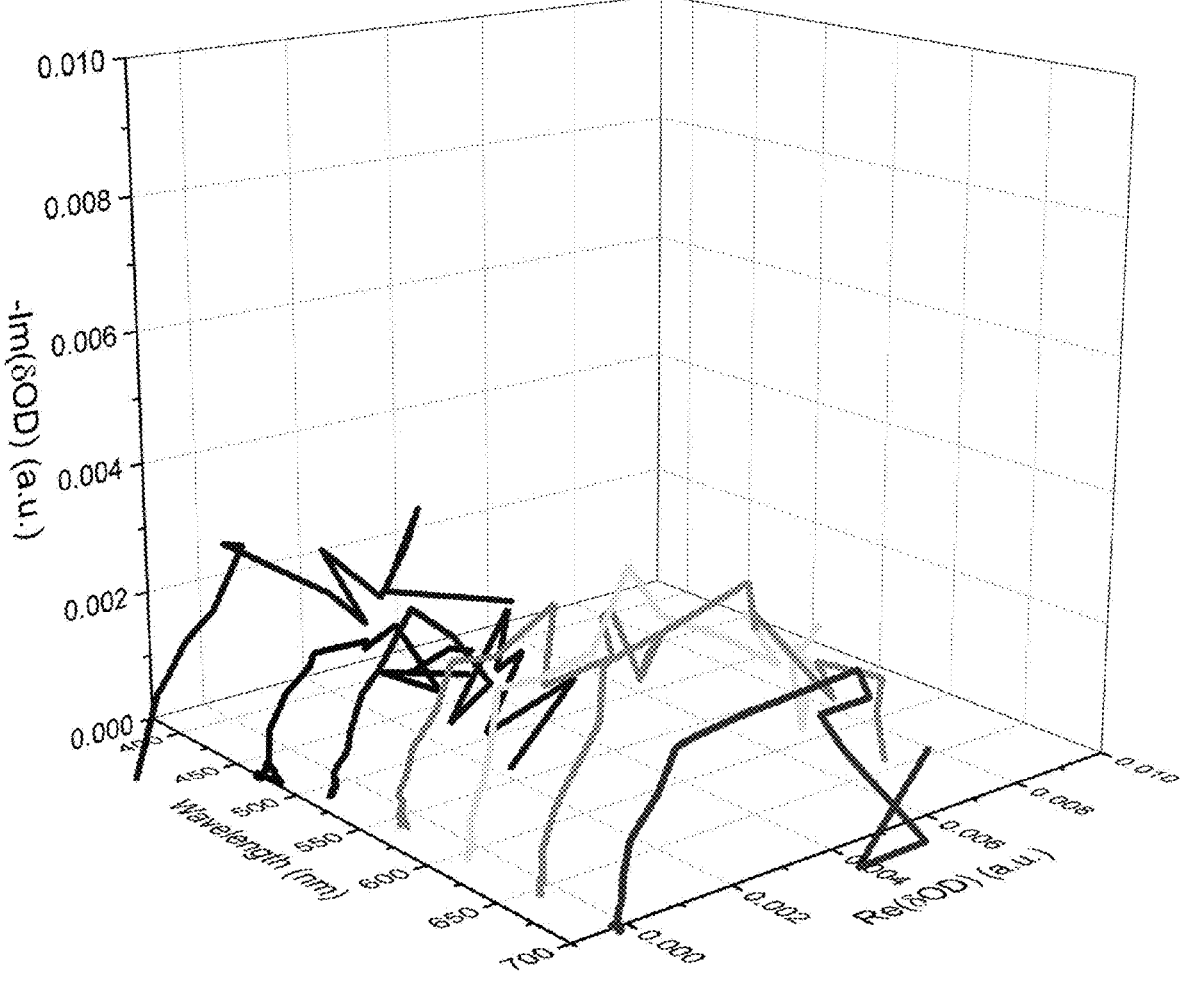
Figures 5C, 5D:
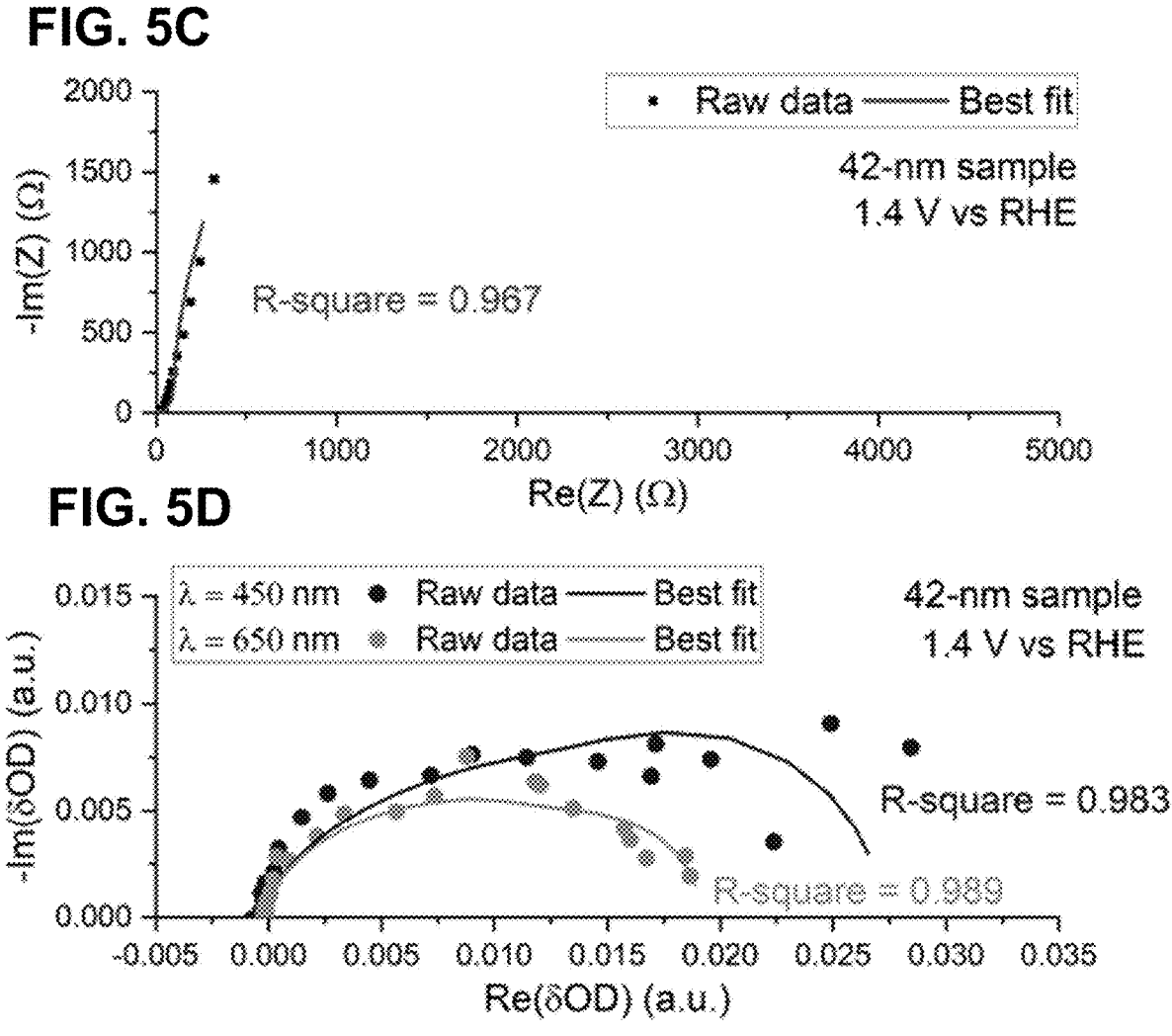
Figures 5E, 5F:
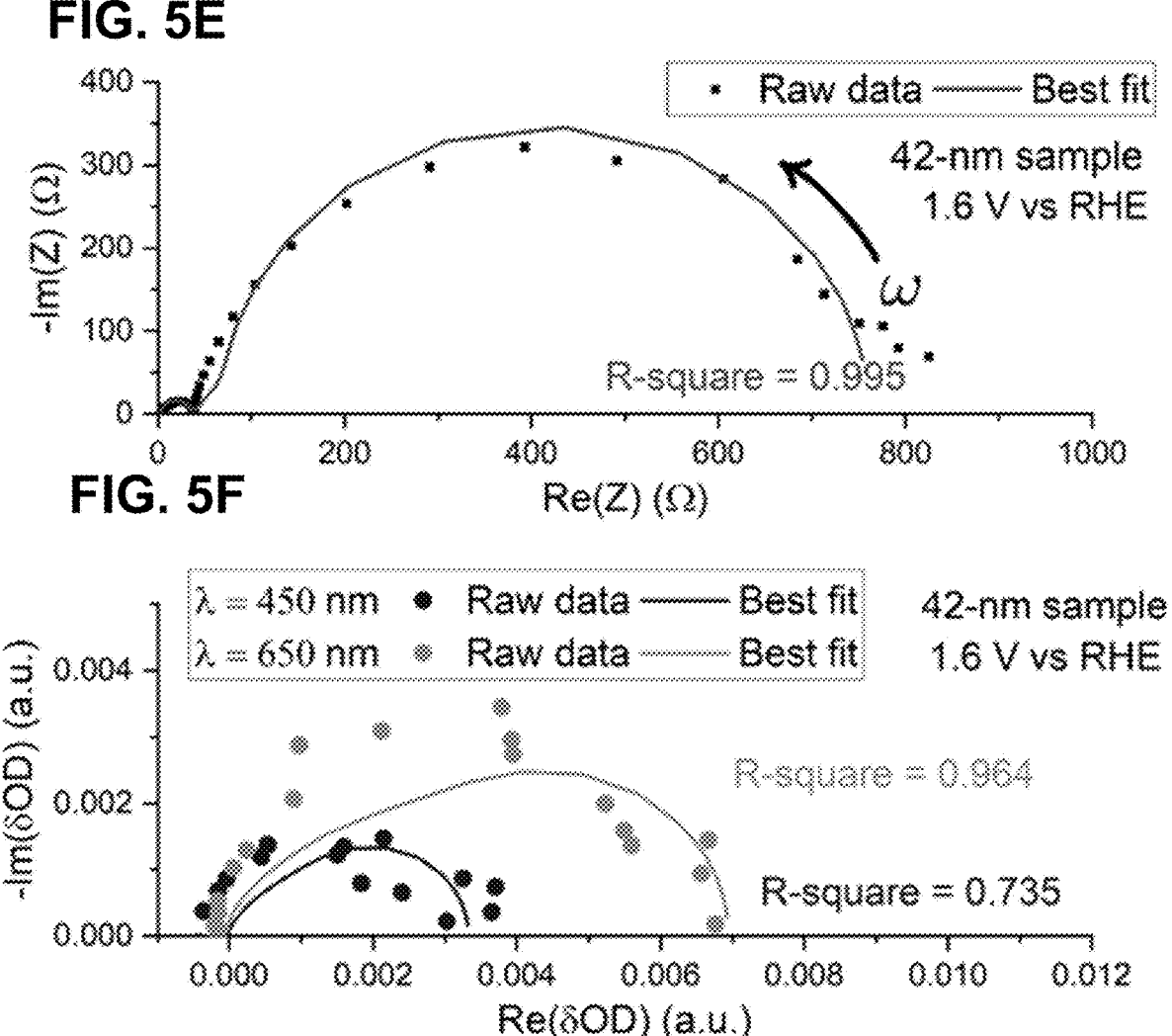
Figure 17A:
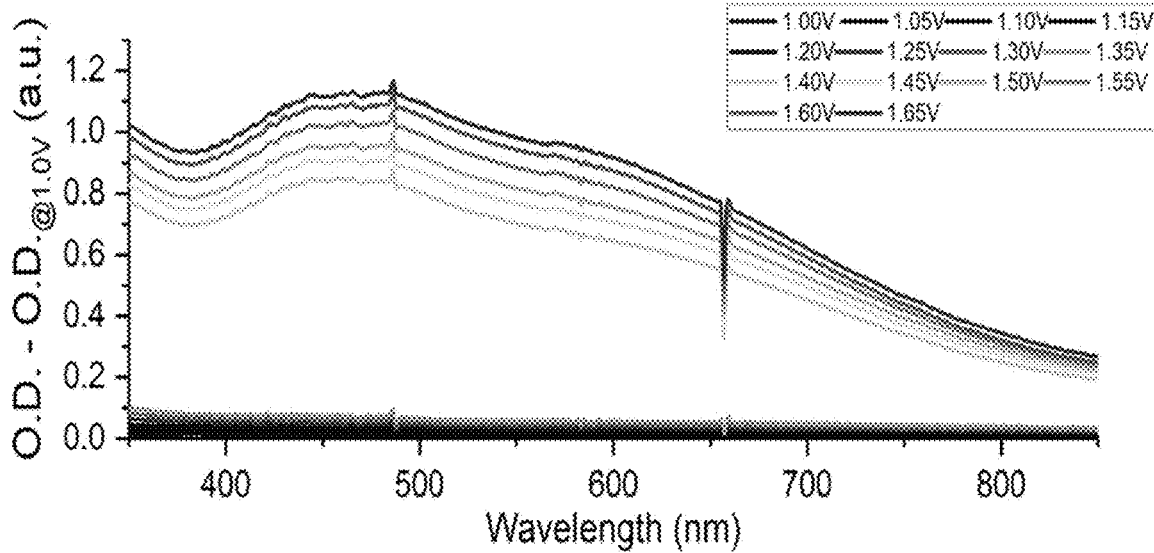
FIGS. 17A-B show according to an exemplary embodiment of the invention DC-based UV-Vis. Operando UV-Visible absorption spectrum of a 42 nm nickel (oxy)hydroxide sample with applied DC voltage. The reference spectrum is the absorption spectrum near (FIG. 17A) OCV (1.0 V), or (FIG. 17B) redox potential (1.4 V). All potentials shown in the diagram are not corrected with uncompensated resistance. Noise at −480 nm and ~660 nm are from the Deuterium-Tungsten Halogen light source.
Figure 17B:
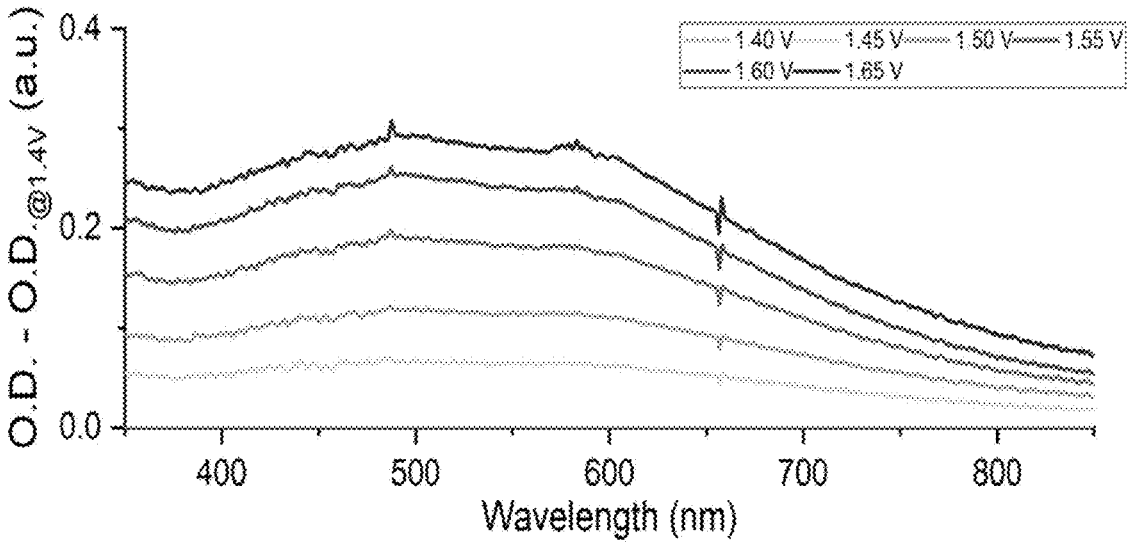

FIGS. 5A-B show the raw δOD data on a 42 nm-thick nickel (oxy)hydroxide film at a 1.4 V (redox) or 1.6 V (OER) vs. RHE DC voltage. The experimental outcome matches the forward simulation prediction: δOD curves fall within the correct quadrant on the Nyquist plot, and the magnitude of δOD grows as the AC frequency decreases. The experimental results also agree with previous CIS efforts on metal oxides. With a monochromator attached to the light source, CIS adds the third axis on typical Nyquist plots to measure the optical response of the film across various wavelengths and probe the material's absorptivity spectrum. Indeed, at 1.4 V, the electrode shows the most substantial response at shorter wavelengths, matching the DC-based operando UV-Vis measurements on nickel (oxy)hydroxide redox (FIGS. 17A-B).

Figure 18A:
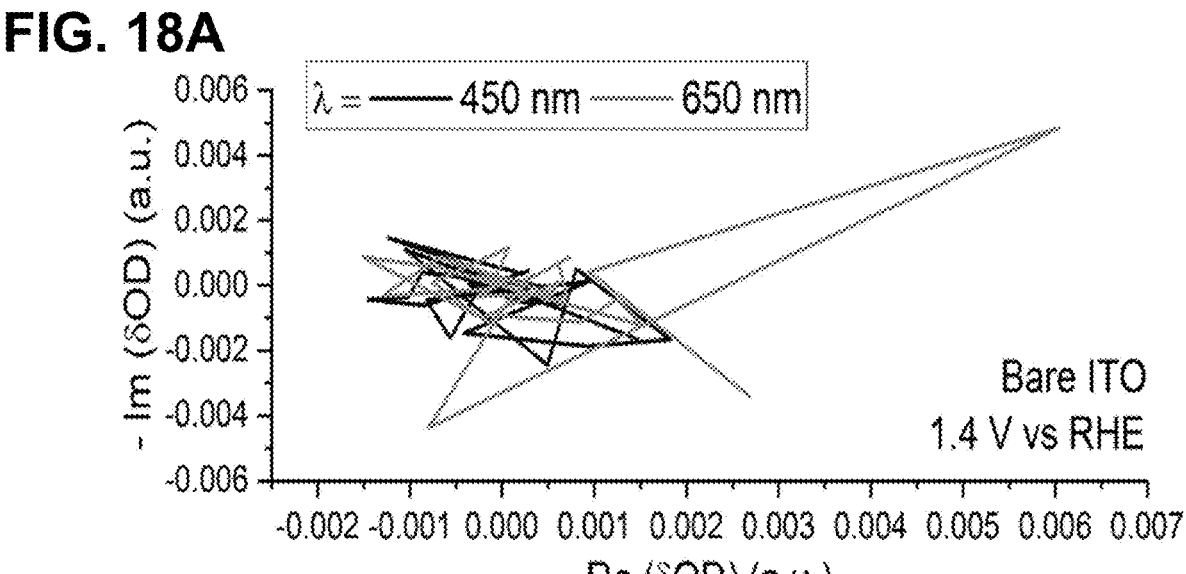
FIGS. 18A-B show according to an exemplary embodiment of the invention CIS on ITO Nyquist plots. CIS experiments on a bare ITO substrate with applied potential at (FIG. 18A) 1.4 V and (FIG. 18B) 1.6 V vs. RHE. All experimental setup and conditions are identical to those in nickel hydroxide films testing.
Figure 18B:
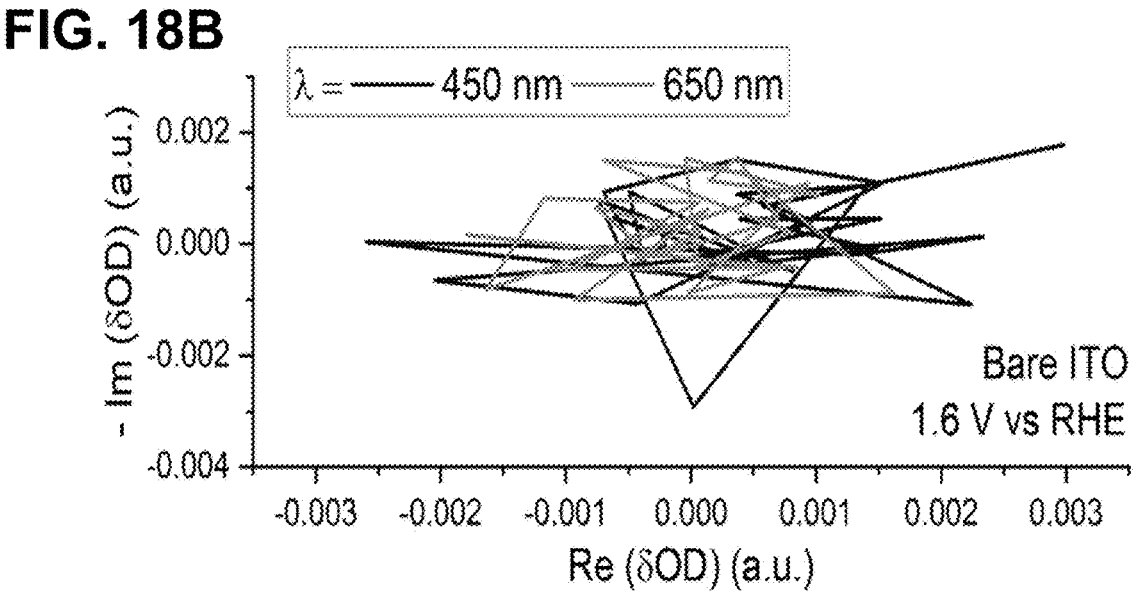

FIGS. 5C-F showcase the analyzed data results from simultaneous EIS and CIS measurement at 1.4 V and 1.6 V, respectively. We choose λ=450 nm and 650 nm as the two wavelengths to compare across different applied voltages. It has been well documented in our DC-based measurement and previous studies that nickel cations have a strong absorption region at λ<500 nm upon oxidizing. The wavelength λ=450 nm is an appropriate wavelength as a representation. On the other hand, it has been demonstrated an increase in absorption of longer wavelengths under OER conditions. Our DC-based measurement agrees with the observation (FIG. 17B). Thus, λ=650 nm is chosen for comparison. One can easily point out that δOD curves at both voltages (FIGS. 5D and 5F) deviate significantly from a perfect semicircle, revealing the material's slow diffusivity; CIS is beneficial to the study of nickel (oxy)hydroxide electrode. At 1.4 V (FIG. 5D), at low frequencies, the magnitude of δOD at λ=450 nm is more significant than that at λ=650 nm, corresponding to a nickel redox-dominating region. As the voltage increases to 1.6 V (FIG. 5F), the CIS Nyquist plot showcases a different absorption spectrum between these two wavelengths: the magnitude of δOD at λ=650 nm is now consistently larger, agreeing with the DC-based results. As the CIS testing on a bare ITO substrate yields noise only (FIGS. 18A-B), we can confirm the experimental data in FIGS. 5D and 5F indeed originates from the nickel (oxy)hydroxide film. Successfully reproducing the well-documented nickel (oxy)hydroxide operando UV-Vis absorption qualitatively validates our CIS setup and results.

Figure 19B:
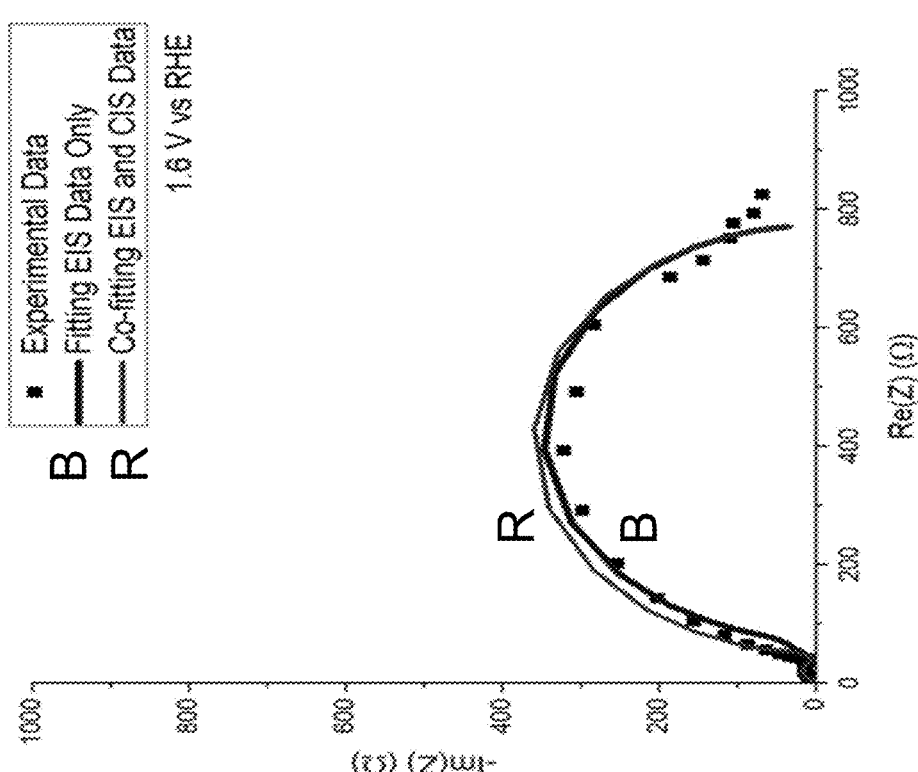
FIGS. 19A-B show according to an exemplary embodiment of the invention fitting the EIS measured during the CIS experiments. Electrochemical impedance responses during CIS experiments on a 42 nm sample film. The applied DC bias is (FIG. 19A) 1.4 V or (FIG. 19B) 1.6 V vs RHE. For each data outcome, the inventors performed EIS parameter fitting with just electrochemical data (B line) or co-fitting the EIS data with CIS data (R line).
Figure 19A:
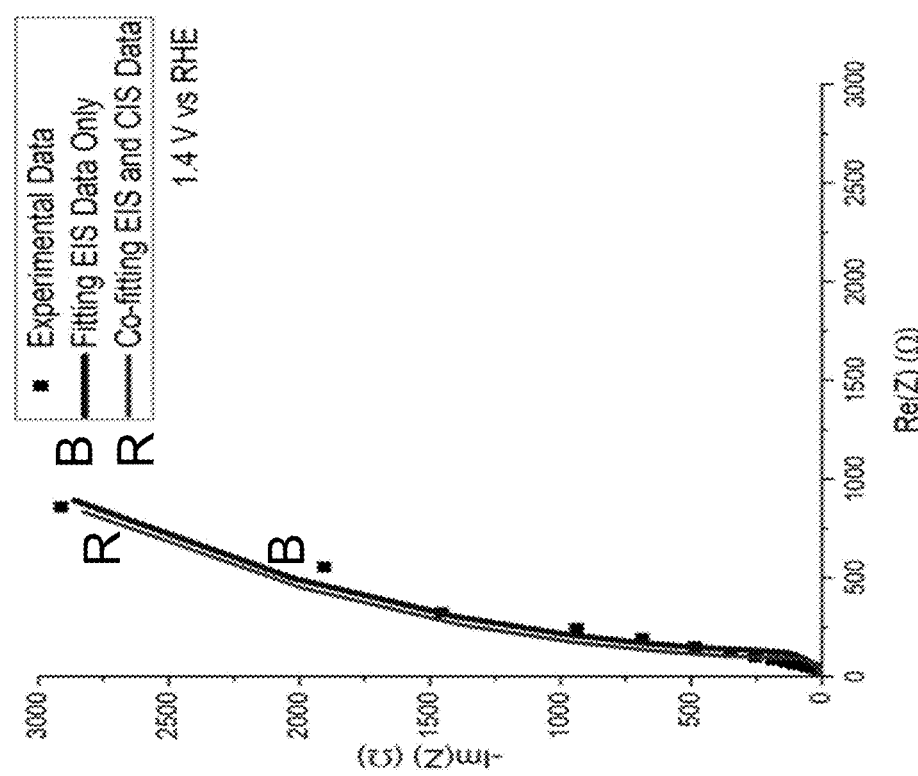

We then adopt the model described above to find the best fit for the experimental data (Supplementary Note 3). First, we can confirm that co-fitting the EIS and CIS data slightly improves the EIS fitting routine (FIGS. 19A-B). Indeed, the EIS is measured simultaneously with the optical response and should benefit from the extra data points from the CIS. The quality check supports the co-fitting algorithm to be applied to all CIS data sets and extract electrochemical kinetics and absorptivity parameters. The fitting results for experimental electrochemical impedance and δOD data are plotted as solid lines (FIGS. 5C-F), all with satisfying fitting quality.

Figure 20A:
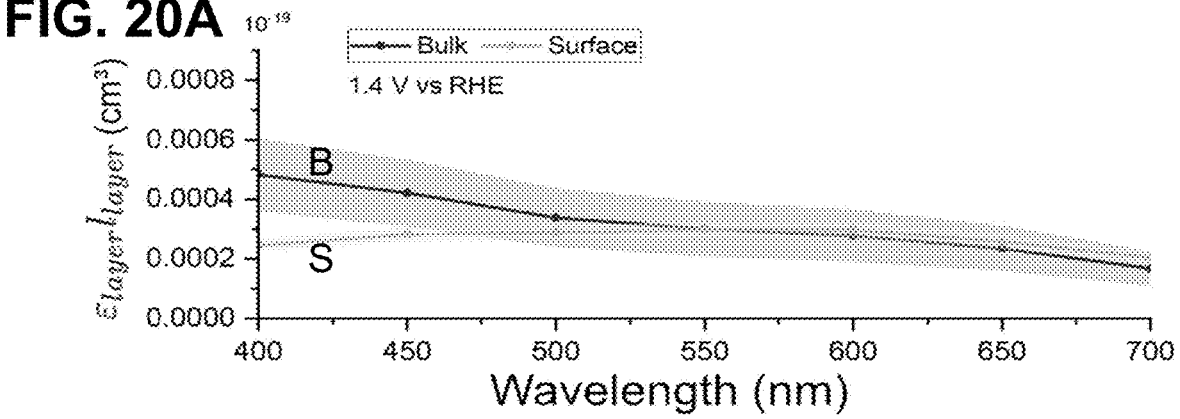
FIGS. 20A-B show according to an exemplary embodiment of the invention the deconvoluting the surface and bulk spectra from CIS results. Calculated best fitting of CIS results on a set of 42 nm nickel (oxy)hydroxide samples with the DC set at (FIG. 20A) 1.4 V and (FIG. 20B) 1.6 V vs RHE. The spectra are expressed as a product of layer absorptivity ($\varepsilon_{layer}$, for bulk or surface layer) and layer thickness ($l_{layer}$). The shaded area indicates the 95% confidence interval (CI) from the fitting (obtained through inverse variance average over individual CI).
Figure 20B:
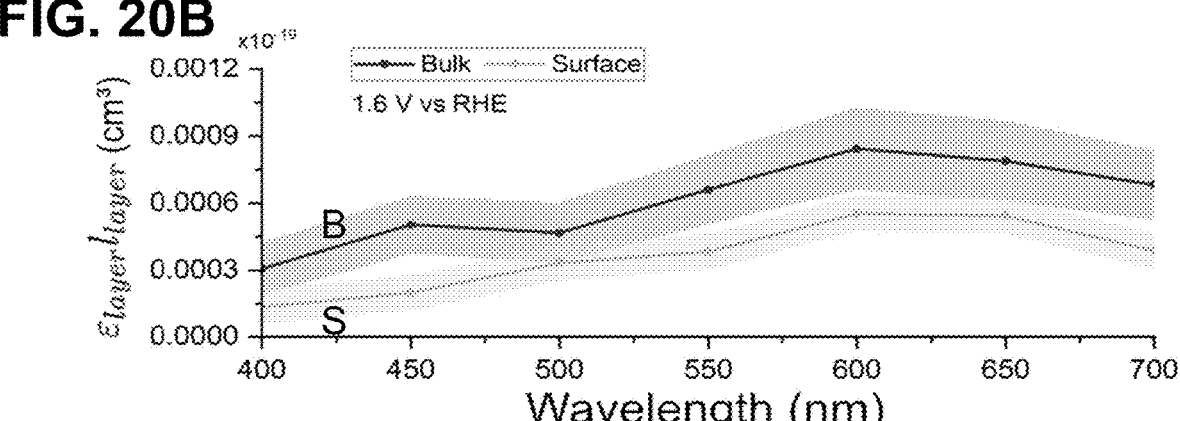

As robust as our model is, the experimental data contains a significant noise level and compromises the CIS data analysis. Theoretically, the model should be able to deconvolute the surface spectrum from the bulk component and obtain the surface layer thickness simultaneously. However, with the limitation the instruments have placed on our data, the fitting covariance matrix shows the dependency relation between the surface layer thickness and the surface absorptivity. Realizing that extracting the surface layer thickness ($l_{surface}$) is impossible, we must make an informed assumption on that value to proceed with the fitting algorithm. Efforts with DC-based operando UV-Vis states the active phase at the surface should be no thicker than 5 nm. An isotope-labeling experiment agrees that the active phase is limited to a few atomic layers near the surface. Thus, we assume $l_{surface}$=5 nm and verify the validity later in this invention. With the assumption, we can obtain fitting results across samples (small parameter variation), though the 95% confidence interval (CI) of individual sample is still significant, possibly due to some residual covariance between fitting parameters. Reporting of absorptivity fitting results then takes the form of the product between thickness and absorptivity ($l_{surface}\varepsilon_{surface}$, $l_{bulk}\varepsilon_{bulk}$ for the bulk component). With 1.4 V vs. RHE applied voltage, the best fitting across a set of 42 nm-thick nickel (oxy)hydroxide shows the surface spectrum is redshifted compared to the bulk (FIGS. 20A-B). While the bulk component appears to be the nickel 2+→3+/4+ redox, the surface one suggests a possible distinct phase. As the anodic voltage increases to 1.6 V, the bulk and surface spectra show striking similarities. However, as the outcome is a product of $\varepsilon$ and $l$, separating bulk and surface spectra requires removing contribution from one of the two parameters. Since $\varepsilon$ is the interest of our study, we have chosen to remove the thickness $l$. As the fitting results are the product between $\varepsilon$ and $l$, additional experiments might be needed to separate the contribution from these two parameters. Further testing could also help lower the error from the fitting routine.

To deconvolute the contribution from thickness, $l$, we repeat the CIS testing varying thickness of nickel (oxy) hydroxide films ranging from 22 nm to 145 nm. FIGS. 6A-B showcase the selected results at 1.4 V and 1.6 V, respectively. Under nickel redox and OER conditions, bulk spectral components scale with the sample thickness, while the surface contribution remains relatively unchanged. The fitting analysis proves that the slope between $\varepsilon*l$ and sample thickness is poorly correlated, rationalizing setting the $l_{surface}$=5 nm. By drawing the linear relation between $\varepsilon_{bulk}l_{bulk}$ and $l_{total}$-$l_{surface}$, we can approximate the apparent bulk absorptivity ($\varepsilon_{bulk}^{apparent}$) with the slope of the best fit line:

$$\varepsilon_{bulk}^{apparent} = \frac{\varepsilon_{bulk}l_{bulk}}{(l_{total} - 5 \text{ nm})} \quad [2]$$

Similarly, the apparent surface absorptivity ($\varepsilon_{bulk}^{apparent}$) is approximated with the intercept of the best fit line with zero slopes:

$$\varepsilon_{surface}^{apparent} = \frac{\varepsilon_{surface}l_{surface}}{5 \text{ nm}} \quad [3]$$

Figure 6C:
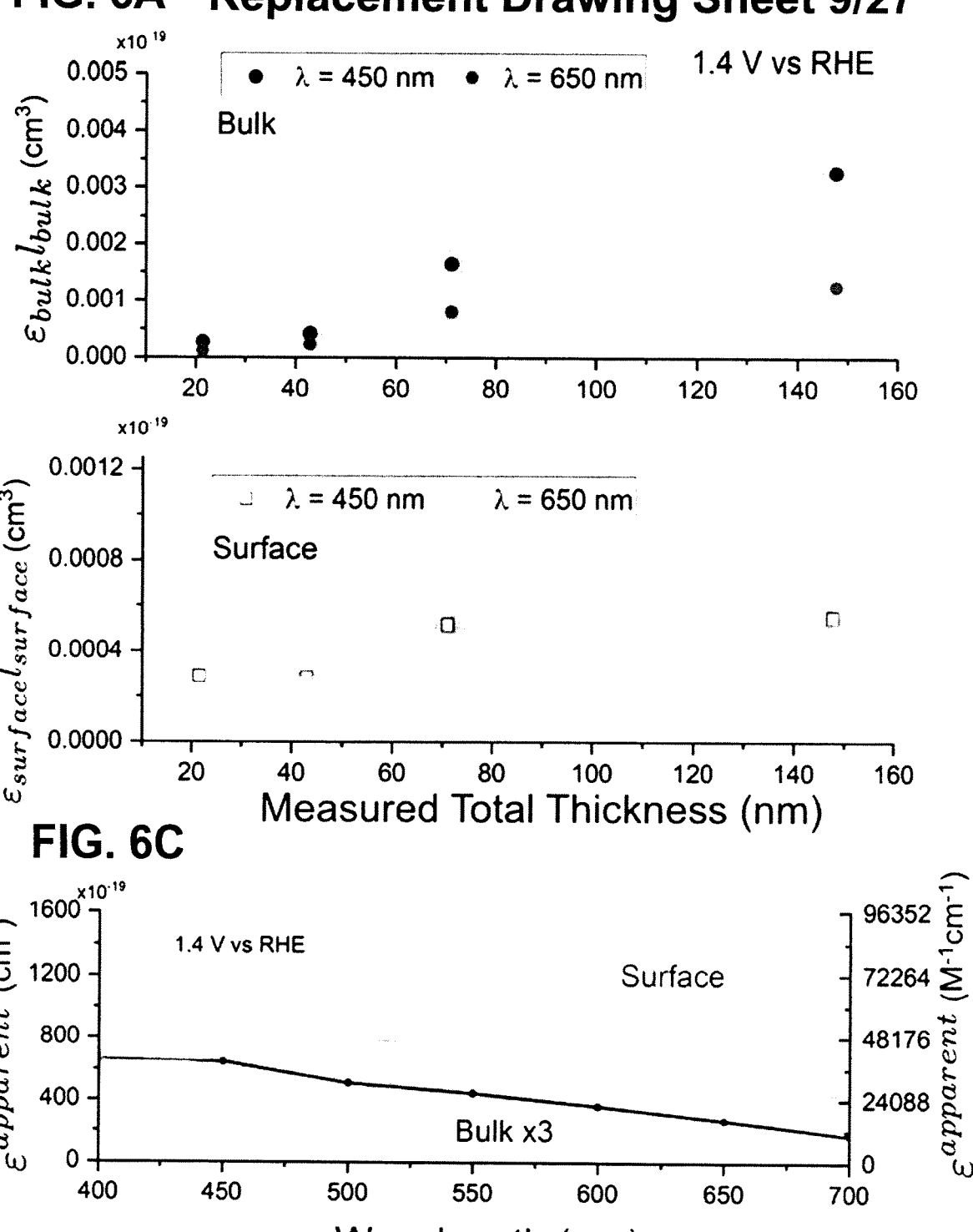
Figures 6B, 6D:
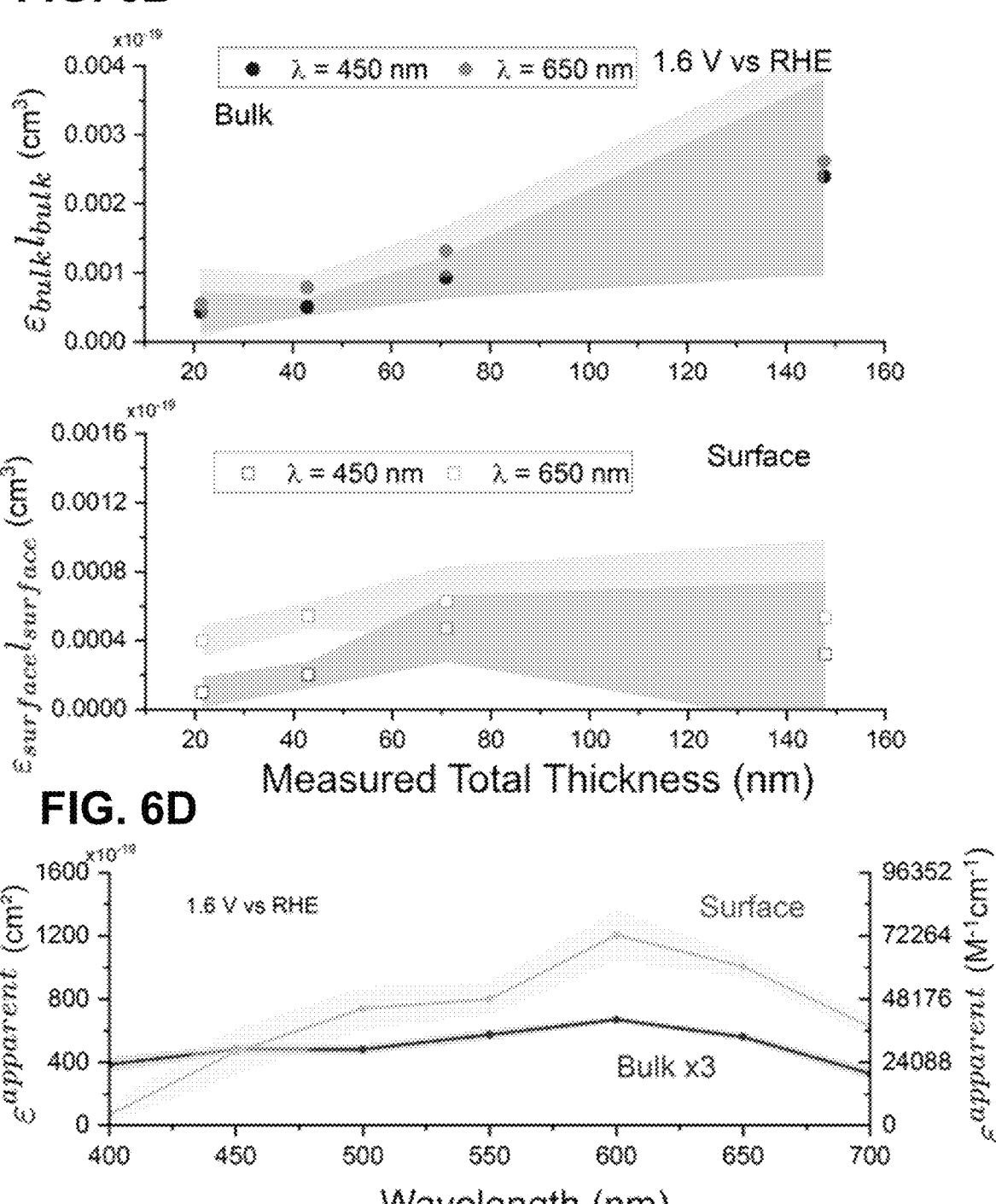
Figure 21A:
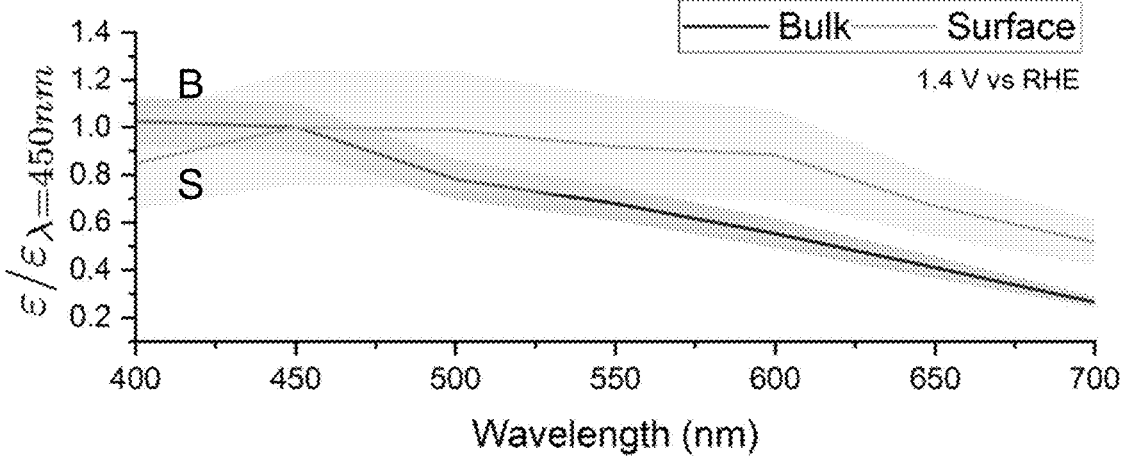
FIGS. 21A-B show according to an exemplary embodiment of the invention a normalized Surface and Bulk Spectrum. Using the absorption coefficient at $\lambda$=450 nm as the reference, the figure shows the normalized spectrum for bulk and surface from FIGS. 6A-D in the main text.
Figure 21B:
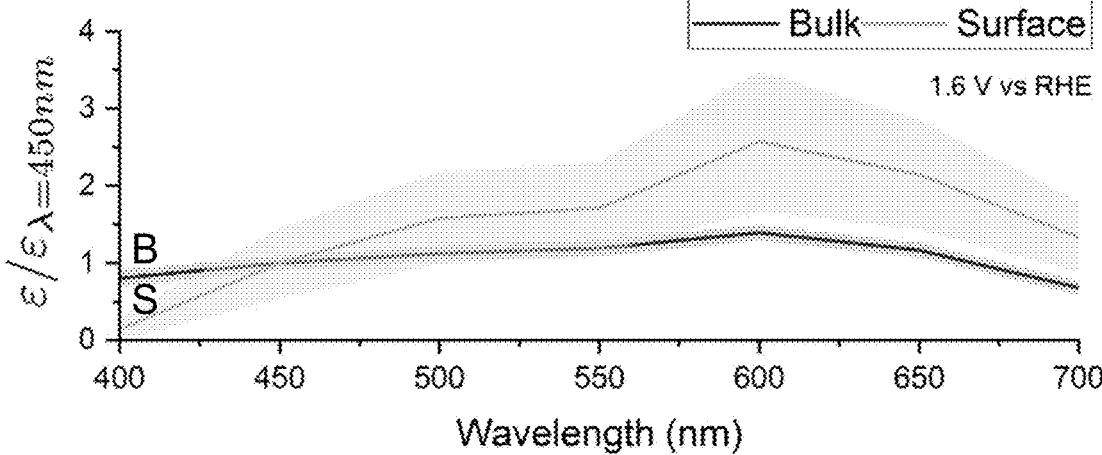

Results of Equation 2-3 at various wavelengths are shown in FIGS. 6C-D. At 1.4 V, analysis of samples across thicknesses still successfully shows the expected nickel redox as the bulk spectrum. Both the DC-based measurement and the CIS-based methods yield similar absorption coefficient with strong absorptivity centered around ~$\lambda$=450 nm (FIGS. 17A-B). After unit conversion (Supplementary Note 4), the CIS-based $\varepsilon_{bulk}^{apparent}$, ~10100 M$^{-1}$ cm$^{-1}$ @ $\lambda$=500 nm, also matches literature values (8250 M$^{-1}$ cm$^{-1}$@ $\lambda$=500 nm[46]). It is also clear that the surface component is redshifted and strongly absorbs more photons. At 1.6 V, the surface layer is still redshifted. Moreover, it is now clear that the surface layer is distinct from the bulk part with the magnitude of $\varepsilon^{apparent}$ is much higher at the surface layer. The difference in the spectral features stands out more when the spectra are normalized (FIGS. 21A-B). The surface spectra in both ion-insertion and OER voltages are more redshifted and centered near $\lambda$=600 nm. The difference in spectral features within the UV-Vis range points toward different chemical process between the surface and the bulk material.

The surface component with a redshifted spectrum proves to be directly related to the increased activity of OER and, therefore, is considered the active phase on the nickel (oxy)hydroxide film under applied anodic voltage. Although UV-Vis is generally not a fingerprint spectroscopic method, a previous study has assigned the spectral change at OER conditions to a second redox process on the nickel center that further oxidizes nickel closer to Ni$^{4+}$. Quadrivalent nickel (Ni$^{4+}$) has been linked to active OER performance. In our CIS setup, we have observed that the more oxidized nickel species appears at the surface layer right after activating the nickel catalyst at ~1.4 V vs. RHE. While the bulk of the film remains as the oxyhydroxide phase, the surface further oxidizes as the spectra redshifts. At 1.6 V vs. RHE, strong surface absorptivity, centered at $\lambda$=600 nm, shows the surface layer continues to accumulate more highly oxidized nickel species. The strong surface absorption coefficient $\varepsilon_{surface}$ up to 1.2×10$^{-16}$ cm$^2$ or ~72000 M$^{-1}$ cm$^{-1}$, may appear exceedingly large, but a previous spectral study on nickel complex molecules measured absorption coefficient at same order of magnitude.

Figure 22A:
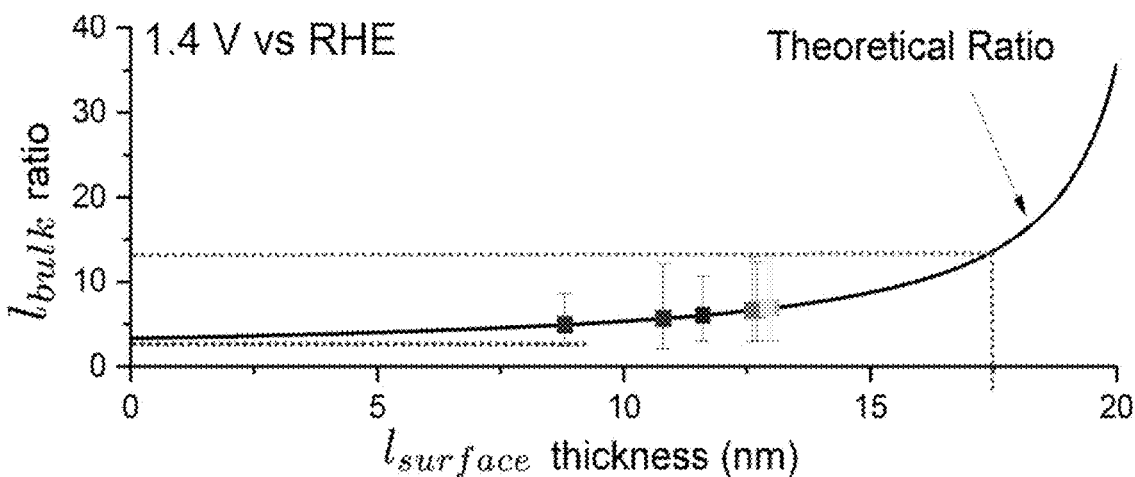
FIGS. 22A-B show according to an exemplary embodiment of the invention an estimating error of surface layer thickness. Taking the ratio of $\varepsilon_{bulk}l_{bulk}$ between the 75 nm and 21 nm-sample set across wavelength, (FIG. 22A) shows the how the values match the theoretical ratio values when $l_{surface}$ varies (solid line) at 1.4 V vs RHE. Each wavelength is color coded to its visible light color. The maximum and minimum possible value is guided with dash lines.
Figure 22B:
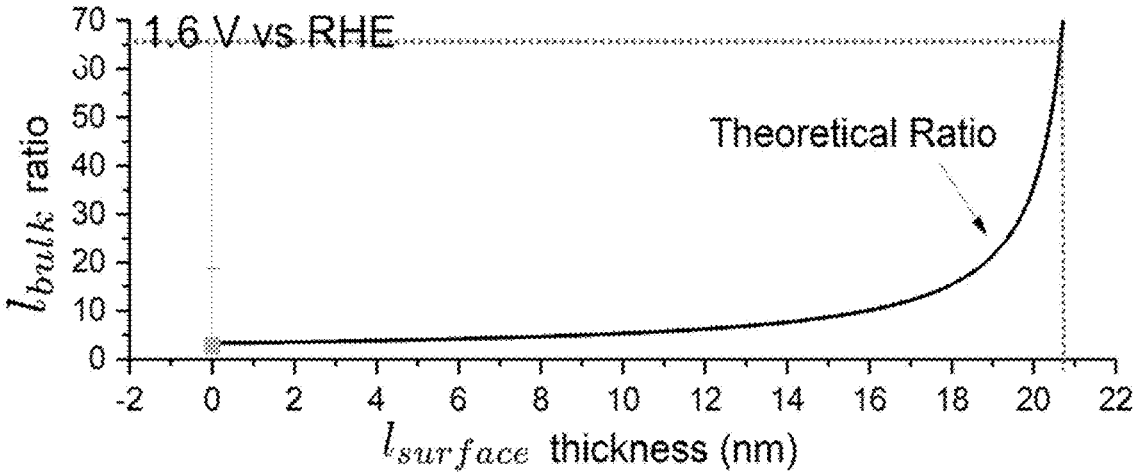
Figure 23A:
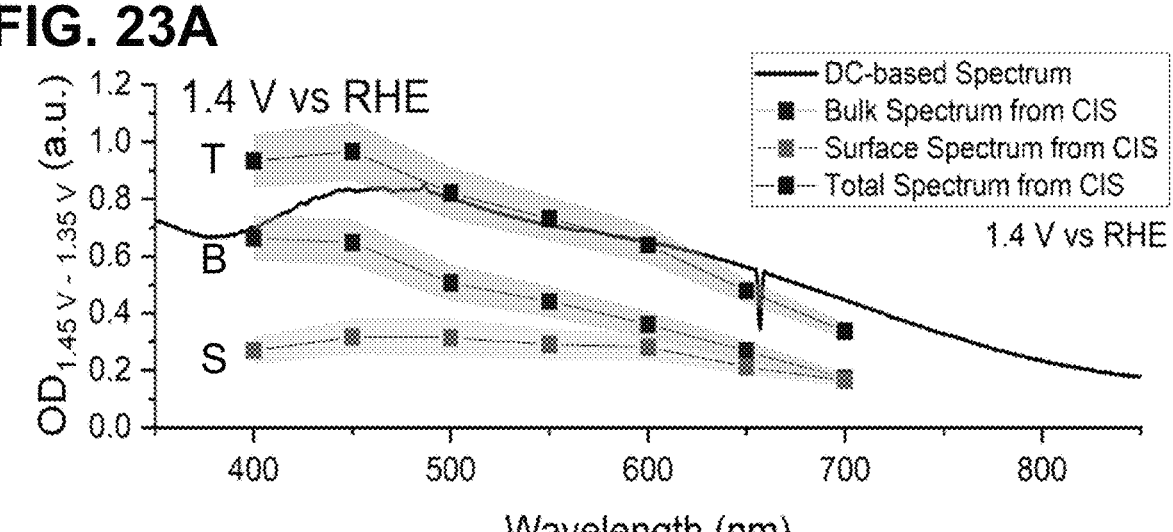
FIGS. 23A-B show according to an exemplary embodiment of the invention reconstructing DC-based spectrum. Based on the surface and bulk $\varepsilon^{apparent}$ calculated in FIGS. 6A-D in the main text, (FIG. 23A) and (FIG. 23B) calculated the bulk, surface, and total optical density change at [1.45 V−1.35 V] and [1.65 V−1.55 V], respectively. Solid black lines in each plot represent the DC-based UV-Vis total OD measurement.
Figure 23B:
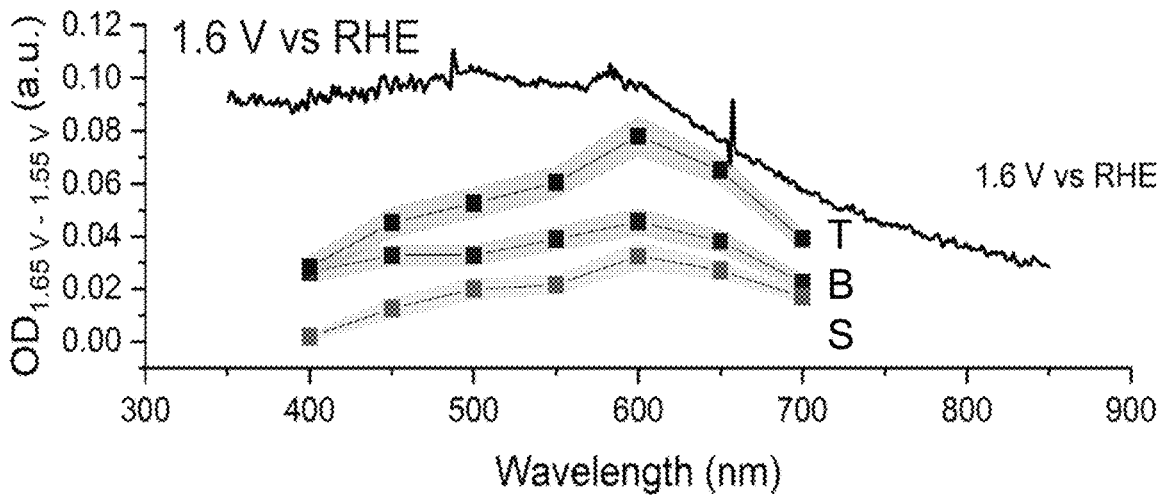

The inventors recognized the uncertainty in the surface layer thickness (Supplementary Note 5, FIGS. 22A-B). A thicker surface layer may lower the magnitude of $\varepsilon_{surface}^{apparent}$. To further validate our CIS results, we have reconstructed the DC-based UV-Vis measurement using $\varepsilon_{bulk}^{apparent}$ and $\varepsilon_{surface}^{apparent}$ (Supplementary Note 6, FIGS. 23A-B), and the results are within reasonable error (CIS cannot capture the nonlinearity and chemical processes with time scales slower than the frequency range).

With our CIS experiment and modeling effort, we can de-convolute the surface layer UV-Vis absorption spectrum from the bulk at any given applied voltage. Separating the complete surface layer spectrum reveals rich chemical information and benefits detailed studies on the electrode surface transformation under any condition. For example, we first show a redshifted surface spectrum on nickel (oxy)hydroxide film right after electrode redox (~1.4 V). Previous operando surface-sensitive methods leveraging the UV-Vis light source are constrained to comparing only one characteristic wavelength across a limited voltage window. Moreover, the setup of our CIS surface measurements is not confined to UV-Vis only. In fact, we have refrained from adopting any specific light source-related characteristics in our concept development (FIGS. 1A-D) and our theory postulation. Although UV-Vis spectroscopy is an accessible, common lab-based method, the resulting spectra are far from sharp to pinpoint specific electronic configuration or chemical bonding environment. When coupled with other lab-based spectroscopies (such as Raman or infrared vibrational spectroscopies), CIS can yield information on the atomic structure of the surface in operando to enable rational development of improved materials. The CIS experimental setup and the analysis model unlock the opportunity to build an extensive toolbox of various in-lab operando surface studies that are accessible, affordable, and easily repeatable.

We have had to rely on comparing CIS results across different thicknesses due to the high noise level in our data. The noise may originate from the source, instability of the diode, or low light intensity after the monochromator. Moreover, the analysis model is an ideal, 1-dimension slab of metal hydroxide. Indeed, there are components, such as surface inhomogeneity, not considered. Possible ways to improve the data quality and the analysis's robustness include adopting a more brilliant coherent light source, lowering the photodiode's thermal noise, and building a comprehensive impedance model to account for more material phenomena.

Methods

Materials

Nickel nitrate ($NiNO_3$, 99.999%) and Potassium Hydroxide (KOH, 99.99%) were purchased from Sigma-Aldrich. Milli-Q water (18.2 M$\Omega$ cm) was purified with Simplicity Water Purification System (Millipore Sigma). Indium tin oxide (ITO)-coated glass (sheet resistance=6-7 $\Omega$/cm$^2$) was purchased from Kintec Company.

Nickel (Oxy)Hydroxide Film Sample Preparation & Characterization

We adapted the deposition procedure. ITO-coated glass substrates were first sonicated in acetone for 20 minutes, followed by another 20-minute sonication in isopropanol. Then, the ITO-coated glass substrates were electrochemically cleaned by applying a 0.4 mA/cm$^2$ current in 1 M KOH aqueous solution for 30 seconds, followed by a 60-second open circuit voltage rest. A potentiostat (Solartron 1287A) controlled the electrochemical current. We repeated the electrochemical cleaning process at least three times until the voltage profile was stable. The ITO-coated glass substrates were then thoroughly rinsed with Milli-Q water.

Nickel hydroxide film was cathodically deposited onto the ITO-coated glass substrates through applying a −0.1 mA/cm$^2$ current in a 0.1 M nickel nitrate aqueous solution for 20 seconds. The current pulse was followed by a 30-second open circuit voltage rest for the electrolyte to replenish the ions. The setup only pumped the electrolyte during the resting period. The procedure was repeated for a pre-determined number of pulses. The film on the ITO-coated glass substrate was then rinsed thoroughly with Milli-Q water.

The deposited film thickness was measured with a Dektak-XT stylus profilometer (Bruker) and the diffraction pattern was measured with a D8 Advance diffractometer with Cu K$\alpha$ X-ray (Bruker).

Electrochemical Measurements

All experiments were carried out in a 0.1 M iron-free KOH aqueous solution. The reference electrode was a PEEK-shrouded leakless miniature Ag/AgCl electrode (eDAQ), and the counter electrode was a platinum wire (99.99%, Sigma-Aldrich). The reference electrode shift was frequently calibrated against a Hydroflex hydrogen reference electrode (eDAQ). Electrochemical testing used a custom-made spectro-electrochemical PEEK flow cell (Ru~10$\Omega$) with a chemical-resistance sapphire optical window (Edmund). The flow cell used an O-ring (Apple Rubber) to seal the liquid. Before the start of each test, the electrolyte was bubbled with oxygen gas (99.999+%, Praxair) for >20 min. A peristaltic pump (New Era Pump System, Inc) continuously pumped the electrolyte at a 3 mL/min rate. Before any color impedance measurements, a three-cycle, 10 mV/s cyclic voltammetry scan was used to measure the electrode redox capacity and OER activity.

DC Spectroelectrochemical Measurements

For operando Ultraviolet-Visible (UV-Vis) absorption experiments with applied direct current (DC), we used the abovementioned spectro-electrochemical PEEK flow cell and the potentiostat. To ensure the bulk composition of the film had equilibrated, the desired voltage was applied to the nickel (oxy)hydroxide sample for >40 min before taking a spectrum. A Deuterium-Tungsten Halogen source (DH-2000, Ocean Optics) supplied the broadband UV-Vis light, and a modular spectrometer (USB2000+, Ocean Optics) collected the spectra. Optic fibers (FG910UEC, ThorLab) guided the incident and transmitted UV-Vis light. Collimating lenses (74-UV, Ocean Optics) ensured uniform illumination on the sample film.

Simultaneous EIS & CIS Measurements

We adopted the abovementioned spectro-electrochemical PEEK flow cell. The potentiostat supplied the DC signal, while a frequency response analyzer (FRA, 1260, Solatron) generated the superimposed alternating current (AC) signal. Here, we set the amplitude of AC to be 50 mV. A Xenon light source (HAL-320, Asahi Spectra) produced a brilliant, steady white light, with a monochromator (CMS-100, Asahi Spectra) selecting the wavelength of interest. A biased photodiode (DET10A2, ThorLab) detected the transmitted light signal intensity. The current output of the photodiode was connected to the FRA for gain and phase analysis compared to the generated AC signal. The FRA simultaneously recorded the electrochemical current response (for EIS) and the photodiode response (for CIS) during the measurements. All instruments were controlled with a LabView script.

Figure 8:
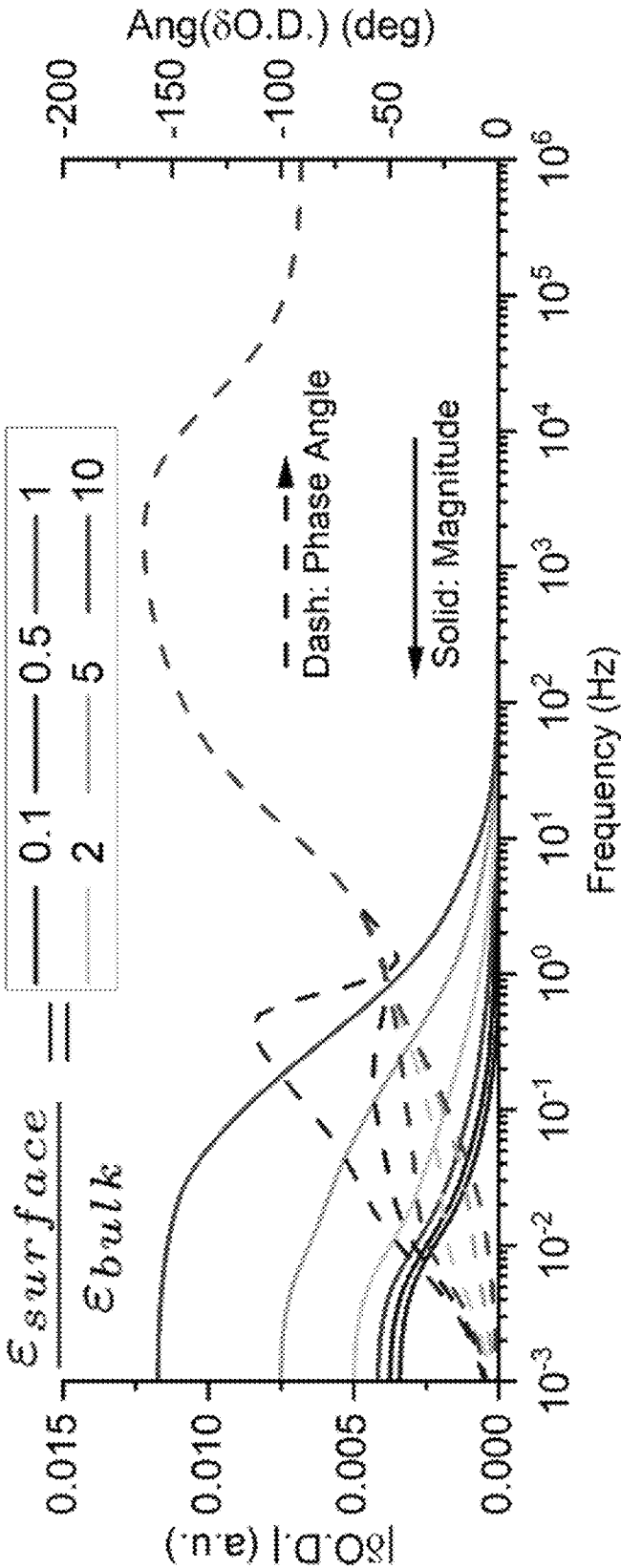
FIG. 8 shows according to an exemplary embodiment of the invention calculated CIS results with extended frequency range. Calculated CIS results, with varying surface-to-bulk absorptivity, presented in a Bode plot. The upper limit of the input frequencies is extended to 1 MHz. The solid line is for the OD perturbation magnitude, while the dashed line is for the phase angle.

To correct for the photodiode responsivity for each wavelength, an applied DC measurement (without AC) with the photodiode is necessary for each sample thickness during data analysis. FIG. 8 shows a sketch of the setup. Instead of connecting the photodiode to the FRA, the setup connected the photodiode output to a current amplifier (5402, Signal Recovery) set to 1 μA/V. A digital-analog converter (USB-6009, National Instruments) recorded the voltage output of the preamplifier. Note that the UV-Vis data from the modular spectrometer is not applicable here since it lacks the photodiode responsivity.

Supplementary Information

Supplementary Note 1: EIS and CIS Model Calculation

The model requires Sc, the concentration perturbation, as an input to calculate the response δOD. EIS models serve as a good starting point for calculating Sc. We adopted a mixed ionic-electronic conductor, transmission line model as our basis (see FIG. 7). For our material system (nickel (oxy)hydroxide films), the ionic species, proton vacancies ($V_H'$), is adopted as the active species, $c_{V_H'}$. One may also choose the electronic species, holes (h'), as the active species since the EIS model assumes local charge neutrality. To start, conservation of mass dictates that, at every position (x) in the material, $$-\frac{\partial J_{V_H'}(x, t)}{\partial x} = ze\frac{\partial c_{V_H'}(x, t)}{\partial t} \qquad [S1]$$

where t is time, ze is the charge of the ion (e is the elementary charge), and $J_{V_H'}$ is the ionic current density. With the material's kinetic parameters, one can retrieve $J_{V_H'}$ from the EIS model. Under AC perturbation, the first-order response of the equation is $$-\frac{\partial \delta J_{V_H'}(x,t)}{\partial x} = ze \frac{\partial \delta c_{V_H'}(x,t)}{\partial t} \qquad \text{[S2]}$$

The zeroth-order terms cancel each other and the higher-order terms are assumed to be negligible. We then apply a Laplace transformation to express the equation in the frequency domain, $$-\frac{\partial \delta J_{V_H'}(x,\omega)}{\partial x} = zej\omega \delta c_{V_H'}(x,\omega) \qquad \text{[S3]}$$

where $\omega$ is the angular frequency, and $j=\sqrt{-1}$. The equation above expresses the relation between $\delta c_{V_H'}$ and $\delta J_{V_H'}$ at each given location, x. To relate optical density to concentration perturbation, we adopt the Beer-Lambert Law, which states that $$OD=\varepsilon(\lambda)lc_{V_H'} \qquad \text{[S4]}$$

where $\varepsilon(\lambda)$ is the absorptivity of the medium at a given wavelength $\lambda$, l is the length of the photon's pathway through such medium (typically, the material thickness), and c is the concentration of the active species causing the color change. Assuming constant l and the linearity of $\varepsilon(\lambda)$ across the AC amplitude, applying a small perturbation to the equation yields $$\delta OD=\varepsilon(\lambda)l\delta c_{V_H'}(\omega) \qquad \text{[S5]}$$

For each location x, the $\delta OD$ can then be expressed as:

$$\delta OD(x,\omega) = \varepsilon(x,\lambda)\delta c_{V_H'}(x,\omega)dx = -\varepsilon(x,\lambda)\frac{1}{zej\omega}\frac{\partial \delta J_{V_H'}(x,\omega)}{\partial x}dx. \qquad \text{[S6]}$$

where $\varepsilon(x,\lambda)$, the local absorptivity, must be considered when calculating $\delta OD$ for materials with a surface layer. We then obtain the overall $\delta OD$ response, which requires an integration of $\delta c_{V_H'}$ over the entire material thickness (l):

$$\delta OD(\lambda) = -\frac{1}{zej\omega}\int_0^l \varepsilon(x,\lambda)\left(\frac{\partial \delta J_{V_H'}(x,\omega)}{\partial x}\right)dx \qquad \text{[S7]}$$

While computers struggle with differentiations and integrations, they can handle discretized linear systems efficiently. Thus, we divide the l into N segments and perform a Riemann sum instead:

$$\delta OD(\lambda) \approx -\frac{1}{zej\omega}\sum_{n=1}^N \varepsilon(n,\lambda)\left(\delta J_{V_H'}(n,\omega) - \delta J_{V_H'}(n-1,\omega)\right) \qquad \text{[S8]}$$

where $n \in [1,N]$. The discretized $\delta J_{V_H'}(n,\omega)$ is a direct output from the EIS model, as the transmission line model is generated from discretizing all the differential equations.

We start from a baseline set of parameters to simulate how the $\delta OD$ changes with the EIS kinetic parameters. Supplementary Table 1 in the main text lists out the definition of each kinetic parameter and the baseline value chosen. The AC frequency range is from 1 MHz to 1 µHz. Calculation of EIS responses, and $SJ_{V_H'}(n,\omega)$ thereof, follows our previous work. We set N=20000 for more accurate results at the expense of calculation resources for the simulation. For each comparison case, we only vary one parameter and keep the rest at the baseline value. Note that, since the electronic conductivity for our model system is orders of magnitude higher than the ionic conductivity, we decide not to vary that parameter. Moreover, although the model keeps $\varepsilon_{surface}$ and $l_{surface}$ independent in the forward simulation, the two parameters show a high degree of covariance during data fitting. Thus, presenting the results as a product of the two parameters is the most suitable option.

Supplementary TABLE 1

| Baseline parameters. The definition of parameters and baseline values used in EIS and CIS simulation. | | |
|---|---|---|
| Parameter | Definition | Value |
| $R^\perp_{OER}(\Omega)$ | Oxygen evolution (electronic) reaction resistance | 5000 |
| $R_{proton}^\perp (\Omega)$ | Proton exchange (ionic) reaction resistance | 50 |
| $C_{dl}$ (µF) | Surface double layer capacity | 500 |
| $C_{Chem}$ (µF) | Chemical capacitance | 2500 |
| $D_{V_H}$ (cm²/s) | Diffusivity of the ionic species (proton vacancy) | 3.16E−13 |
| $\varepsilon_{surface}$ (cm²) | Absorptivity of surface layer | 5.67E−17 |
| $\varepsilon_{bulk}$ (cm²) | Absorptivity of the bulk | 2.27E−18 |
| $l_{total}$ (nm) | Total material thickness | 50 |
| $l_{bulk}$ (nm) | Bulk layer thickness | 40 |
| $l_{surface}$ (nm) | Surface layer thickness | 10 |
| $\sigma_h \cdot (\Omega^{-1}cm^{-1})$ | Conductivity of the electronic species (hole) | 0.118 |

Supplementary Note 2: Color Impedance Data Analysis

Here, we have postulated the relation between the FRA readout (from Supplementary FIG. 7) and the optical density response of the material. Optical density is commonly expressed as:

$$OD = -\ln\left(\frac{I_{photon}}{I_{0,photon}}\right) \qquad \text{[S9]}$$

where OD is the optical density of the material, $I_{0,photon}$ is the constant incident light, and $I_{photon}$ is the transmitted light. We then apply a small perturbation, $\delta$, on both sides of the equation:

$$\delta OD = \delta\left(-\ln\left(\frac{I_{photon}}{I_{0,photon}}\right)\right) = -\left(\frac{I_{0,photon}}{I_{photon}}\frac{\delta I_{photon}}{I_{0,photon}}\right) = -\left(\frac{\delta I_{photon}}{I_{photon}}\right) \qquad \text{[S10]}$$

Considering the photodiode's responsivity to the detected photon, $\alpha(\lambda)$ (at a given wavelength $\lambda$), we rewrite the expression of $\delta OD$ as $$\delta OD = -\left(\frac{\delta I_{photon}}{I_{photon}}\right)\left(\frac{\alpha(\lambda)}{\alpha(\lambda)}\right) = -\left(\frac{\delta J_{photon}}{J_{photon}}\right) \qquad \text{[S11]}$$

where $J_{photon}$ is the DC-only output current from the photodiode. Since the FRA processes the amplitude and phase between two perturbation signals, we then add the applied AC electrochemical signal, $\delta V_{ac}$, to both the numerator and denominator. After rearrangements, $\delta OD$ is expressed as $$\delta OD = -\left(\frac{\delta J_{photon}}{\delta V_{ac}}\right)\left(\frac{\delta V_{ac}}{J_{photon}}\right) = -Y_{FRA}\left(\frac{\delta V_{ac}}{J_{photon}}\right) \quad [S12]$$

in which all the terms are either settings ($\delta V_{ac}$) or an FRA output, $Y_{FRA} = \delta J_{photon}/\delta V_{ac}$, except for $J_{photon}$. While the optical response to the perturbation, $\delta J_{photon}$, is recorded by the FRA, $J_{photon}$ is not. If an FRA can simultaneously measure the DC response of the photodiode photocurrent, then the equation above suffices. However, our setup lacks this capability, so we must adopt a separate setup, which removes the FRA and reads $J_{photon}$ with a current amplifier (Supplementary FIG. 8). We set the amplifier with a converting ratio $\rho_{amp}$ (A/V) and obtain a computer-readable voltage signal, $V_{photon}$:

$$V_{photon} = J_{photon}/\rho_{amp} \quad [S13]$$

With this relation, we can finally analyze the raw output, $Y_{FRA}$, and arrive at $\delta OD$. Since $Y_{FRA}$ compares the gain and phase between the $\delta J_{photon}$ and $\delta V_{ac}$, the output, $Y_{FRA}$, takes form as a complex number. As a result, $\delta OD$ is also a complex number. We choose the format of a Nyquist plot to express the experimental $\delta OD$ results.

Supplementary Note 3: EIS and CIS Data Fitting

The CIS model developed in the last section and the EIS model from Liang et al (Modeling for Mixed Conductors with Simultaneous Insertion & Electrocatalytic Reactions: A Case Study of Transition-Metal Hydroxides in Aqueous Electrolyte. *J Electrochem Soc* (2022) doi:10.1149/1945-7111/ac6772) are used to fit the processed experimental data. The script, written in the MatLab environment, finds the optimized fit for the EIS and CIS simultaneously. Due to the highly non-linear nature of the problem, the optimization process is computationally expensive. Thus, the script chooses N=2500 to save on the computing resources. The authors have tried to increase the number of N and observed negligible differences. First, the algorithm fits the EIS parameters, including the oxygen evolution reaction resistance (electronic interfacial reaction, $R_{OER}^{-1}$), proton exchange reaction resistance (ionic interfacial reaction, $R_{proton}^{-1}$), proton vacancy diffusivity ($D_{V_H}$), and chemical capacitance ($C_{chem}$). The electronic conductivity is assumed to be at constant at $\sigma_h = 0.118\ \Omega^{-1}\ cm^{-1}$,[2] and the double layer capacitance is chosen as $C_{dl} = 40\ \mu F/cm^2$.[3,4] With the preliminary outcome from EIS fitting, the algorithm moves on to the CIS parameters fitting. Here, we adopt co-fitting method to (1) set appropriate constraints on the absorptivity outcome and (2) improve the quality of EIS parameter by providing extra data points. Bulk parameters, namely $C_{chem}$ and $D_{V_H}$, are included during co-fitting, while the interfacial reaction kinetics are held constant. For the CIS parameters, the algorithm suffers from separating $\varepsilon_{surface}$ and $l_{surface}$ for every data set. The Jacobian matrices from the fitting results show a linear dependence relationship between the two parameters within our experimental measuring precision. Thus, during the fitting process, we set $l_{top}$ to a constant value (5 nm) and find the best fits for $\varepsilon_{surface}$ and $\varepsilon_{bulk}$, and we only report the product of $\varepsilon_{surface}$ and $l_{surface}$ (and of $\varepsilon_{bulk}$ and $l_{bulk}$) in this study.

Supplementary Note 4: Calculating Absorption Coefficient

To convert an $\varepsilon$ with a unit of [cm$^2$] to molar absorption coefficient (molar extinction coefficient) with a unit of [M$^{-1}$ cm$^{-1}$]:

$$\varepsilon(M^{-1}cm^{-1}) = \quad [S14]$$

$$\varepsilon(cm^2) \times \frac{cm}{cm} \times \frac{6.02 \times 10^{23}\ \text{charge carrier}}{1\ \text{mole of charge carrier}} \times \frac{1\ L}{1000\ cm^3}$$

Supplementary Note 5: Estimating Error for the Surface Layer Thickness

Based on a previous suggestion, we chose the surface layer thickness ($l_{surface}$) to be 5 nm throughout our fitting routine. However, we recognize our uncertainty in the $l_{surface}$ value and need to put a boundary on it. To estimate the error, we leverage the ratio of $\varepsilon_{bulk}l_{bulk}$ from two sample thickness groups—75 nm and 21 nm samples. Since $\varepsilon_{bulk}$ should be the same across sample thicknesses, we know that the ratio:

$$\frac{\varepsilon_{bulk}l_{bulk,75\ nm\ sample}}{\varepsilon_{bulk}l_{bulk,21\ nm\ sample}} = \frac{l_{bulk,75\ nm\ sample}}{l_{bulk,21\ nm\ sample}} = \frac{75\ nm - l_{surface}}{21\ nm - l_{surface}} \geq 3.57 \quad [S15]$$

has a minimum value of 3.57 if $l_{surface}=0$. Taking the ratio at each measured wavelength, Supplementary FIG. 16 shows how the ratio data from each wavelength matches the theoretical value calculated from Equation S15. At 1.4 V vs. RHE, the maximum value happens with $\lambda=550$ nm. The ratio value corresponds to the maximum possible $l_{surface}=15$ nm. The lower bound, however, cannot be determined since the minimum value falls below the theoretical value of 3.57. At 1.6 V vs. RHE, the maximum value happens with $\lambda=600$ nm, pointing to a possible $l_{surface}=8$ nm. Again, the minimum value falls below 3.57 and cannot be determined. Thus, we claim that $l_{surface}$ has a value between 0 nm and 15 nm.

Supplementary Note 6: Reconstructing the DC-Base UV-VIS Spectrum

To validate that the absorption coefficients ($\varepsilon^{apparent}$) obtained in FIGS. 6A-D in the main text, we use them to reconstruct the DC-based spectrum. Barring some non-linearity over a large voltage window, the CIS-based result should reconcile with the DC-based one. DC based $\Delta OD$ can be calculated from $\varepsilon^{apparent}$ with:

$$\Delta OD = \varepsilon_{bulk}^{apparent}l_{bulk}c_{ion} + \varepsilon_{surface}^{apparent}l_{surface}c_{ion} \quad [S16]$$

Where $c_{ion}$ is the concentration of the ionic species. For reconstructing the $\Delta OD$ at 1.6 V vs. RHE, $c_{ion}$ is calculated from the chemical capacitance, a parameter output from the fitting process:

$$c_{ion} = C_{chem,ion} * \Delta V/l_{total} @ 1.6\ V\ vs\ RHE \quad [S17]$$

Where $\Delta V$ is the voltage step used to measure $\Delta OD$, and $l_{total}$ is the total film thickness. Since the our impedance model allows charge to distribute across the entire film, total film thickness is used to calculate the concentration. On the other hand, since the nickel (oxy)hydroxide film undergoes a redox process at a voltage close to 1.4 V vs. RHE (judging from the huge OD jump in FIGS. 17A-B and the cyclic voltammetry in FIG. 16), we must include some charge from the redox process. With the redox potential at ~1.36 V vs. RHE (from the CV result), we decide to calculate $c_{ion}$ with half the redox charge measured from CV ($Q_{CV,redox}$) and half the chemical capacitance measured from EIS:

$$c_{ion} = \frac{1}{2}Q_{CV,redox} + \frac{1}{2}\left(C_{chem,ion} * \delta V/l_{total}\right) @ 1.4\ V\ vs\ RHE \quad [S18]$$

To preserve the linearity assumption in our CIS model and experiments, $\Delta V$ is chosen to be $\pm V_{ac}$ (AC amplitude used in CIS measurement, 50 mV). Then, for 1.4 V result, $\Delta OD=OD_{1.45\ V}-OD_{1.35\ V}$. Similarly, for 1.6 V, $\Delta OD=OD_{1.65\ V}-OD_{1.55\ V}$.

Other embodiments and teachings are provided in the priority document to which this application claims priority, which is U.S. Provisional Patent Application 63/390,143 filed Jul. 18, 2022, and which is incorporated herein by reference for everything it teaches.

CONCLUSION

The inventors developed a color impedance spectroscopy (CIS)-based method to enable affordable and accessible operando surface-sensitive spectroscopic measurements on MIEC electrodes. The CIS method controls the probing depth through tuning the applied AC frequencies, limiting the active species' movement near the surface at higher AC frequencies to yield surface-dominated spectral signals. Theoretically, CIS can extract a complete spectrum of the surface chemistry at any given applied voltage. Built on previously developed transmission line impedance modeling, a forward simulation model validates our approach. The calculation shows that the bulk kinetic parameters (such as diffusivity and chemical capacitance) strongly correlate with the CIS outcomes. At the same time, the interfacial reaction phenomena have lesser degrees of influence. We apply our CIS method using a UV-Vis light source to probe model nickel (oxy)hydroxide films in alkaline electrolyte. Raw measurement data show spectral changes as the voltage is increased from the nickel redox region into OER conditions. By interpolating the CIS results across different sample thicknesses, we prove the existence of a surface layer with strong absorptivity centered around $\lambda=600$ nm, significantly redshifted from nickel bulk redox absorption change. By deconvoluting CIS results across voltages, we see a surface layer with distinct chemical process appearing right after the nickel redox near 1.4 V vs. RHE and continues to be active at more anodic OER voltages. The active phase for OER at the surface layer is thought to be a highly oxidized nickel species. Further development on the CIS surface-sensitivity through improving signal-to-noise ratio and adding more light source options can enable more comprehensive applications and more accurate mechanistic studies on material surfaces.

What is claimed is:

1. A method of performing surface selective optical characterization, the method comprising:
   (a) performing color impedance spectroscopy (CIS) on a sample over an input electrical frequency range to provide a CIS spectrum;
   (b) performing data analysis of the CIS spectrum to distinguish a surface CIS contribution to the CIS spectrum from a bulk CIS contribution to the CIS spectrum; and
   (c) outputting the surface CIS contribution as a surface characterization result of the sample.

2. The method set forth in claim 1, further comprising performing electrochemical impedance spectroscopy to provide auxiliary information for the data analysis.

3. The method set forth in claim 1, wherein the sample is a metal oxide, a metal hydroxide, a metal phosphate, a metal cyanide, a carbon-based polymer, or a mixture thereof.

4. The method set forth in claim 1, wherein the input electrical frequency range is 0.001 Hz to 1 MHz.

5. The method set forth in claim 1, wherein the data analysis comprises (i) calculating an ionic and an electronic concentration change with respect to a distance from a surface of the sample, (ii) calculating and analyzing an electrical response from the sample under an applied alternating electrical signal, (iii) assigning spectroscopic properties of a material with respect to a distance from the surface, (iv) calculating and analyzing a spectroscopic response from the samples under the applied alternating electrical signal, or any combination thereof.

6. The method set forth in claim 1, wherein the auxiliary information comprises a thickness of the sample, a dielectric constant of the sample, kinetics of an electron transport in the sample, kinetics of an ionic transport in the sample, an electronic capacitance of the sample, an ionic capacitance of the sample, an electronic reaction resistance at a sample-current collector interface, the electronic reaction resistance at a sample-electrolyte interface, an ionic reaction(s) resistance at the sample-electrolyte interface, and a sample-electrolyte interface charge capacitance.

7. The method set forth in claim 1, wherein the optical characterization is performed by an optical source originating from an X-ray, an ultraviolet source, a visible light source, an infrared light source, or a mixture thereof.

\* \* \* \* \*